United States Patent
Foster et al.

(10) Patent No.: US 8,270,783 B2
(45) Date of Patent: Sep. 18, 2012

(54) SILICON INTEGRATED PHOTONIC OPTICAL PARAMETRIC AMPLIFIER OSCILLATOR AND WAVELENGTH CONVERTER

(75) Inventors: Mark Foster, Sparks Glenoe, MD (US); Alexander Gaeta, Ithaca, NY (US); Michal Lipson, Ithaca, NY (US); Jay Sharping, Turlock, CA (US); Amy Foster, Sparks Glenoe, MD (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 13/167,563

(22) Filed: Jun. 23, 2011

(65) Prior Publication Data

US 2011/0249932 A1    Oct. 13, 2011

Related U.S. Application Data

(63) Continuation of application No. 12/056,224, filed on Mar. 26, 2008, now Pat. No. 8,041,157.

(60) Provisional application No. 60/908,002, filed on Mar. 26, 2007.

(51) Int. Cl.
*G02B 6/12* (2006.01)
*H04J 14/02* (2006.01)
*H01S 3/00* (2006.01)

(52) U.S. Cl. ........... 385/14; 385/122; 385/129; 398/81; 398/186; 359/333

(58) Field of Classification Search .......... 385/14, 385/31, 123, 122, 141, 24, 129, 130, 131, 385/132; 398/81, 79, 186; 359/333; 372/92, 372/98, 72, 21, 22, 23
See application file for complete search history.

(56) References Cited

U.S. PATENT DOCUMENTS

| | | | |
|---|---|---|---|
| 5,377,043 A * | 12/1994 | Pelouch et al. | 359/326 |
| 5,579,152 A * | 11/1996 | Ellingson et al. | 359/330 |
| 6,870,664 B2 * | 3/2005 | Jovanovic et al. | 359/333 |
| 8,041,157 B2 * | 10/2011 | Foster et al. | 385/4 |
| 2006/0245461 A1 * | 11/2006 | Islam | 372/75 |
| 2008/0285606 A1 | 11/2008 | Kippenberg et al. | |
| 2011/0249932 A1 * | 10/2011 | Foster et al. | 385/1 |

OTHER PUBLICATIONS

L. F. Mollenauer, R. H. Stolen, and J. P. Gorden. "Experimental Observation of Picosecond Pulse Narrowing and Solitons in Optical Fibers". Phy. Rev. Lett. 45, 1095-1098 (1980).
G.P. Agrawal. "Nonlinear Fiber Optics". Academic Press (1989).

(Continued)

*Primary Examiner* — Brian Healy
(74) *Attorney, Agent, or Firm* — Choaet Hall & Stewart LLP

(57) ABSTRACT

The present invention is directed towards systems and methods for adjusting intensity, wavelength and higher and lower frequency components of an optical signal. Photonic apparatus receives a first and a second optical signal. A waveguide provides an anomalous group velocity dispersion the first optical signal or the second optical signal and adjusts intensity or wavelength of the first optical signal or the second optical signal, in response to the anomalous group velocity dispersion. In some embodiments photonic apparatus receives an optical signal comprising a lower frequency component received an amount of time prior to a higher frequency component of the optical signal. A waveguide provides an anomalous group velocity dispersion for the optical signal and adjusts the amount of time between the higher frequency component and the lower frequency component in response to the anomalous group velocity dispersion.

46 Claims, 5 Drawing Sheets

OTHER PUBLICATIONS

G.P. Agrawal. "Fiber-Optic Communication Systems". John Wiley & Sons, Inc (1997).

Ciaramella, E. and Trillo, S. "All-Optical Reshaping via Four-Wave Mixing in Optical Fibers". IEEE Photon. Technol. Lett. 12, 849-851 (2000).

J. C. Knight, J. Arriaga, T. A. Birks, A. Ortigosa-Blanch, W. J. Wadsworth, and P. St. J. Russell. "Anomalous Dispersion in Photonic Crystal Fiber". IEEE Photon. Technol. Lett. 12, 809-809 (2000).

J. K. Ranka, R. S. Windeler, and A. J. Stentz. "Visible Continuum Generation in Air-Silica Microstructure Optical Fibers with Anomalous Dispersion at 800 nm". Opt. Lett. 25, 25-27 (2000).

D. G. Ouzounov, D. Homoelle, W. Zipfel, W. W. Webb, A. L. Gaeta, J. A. West, J. C. Fajurdo, and K. W. Koch. "Dispersion Measurements of Microstructured Fibers using Femtosecond Laser Pulses". Opt. Commun. 192, 219-223 (2001).

J. E. Sharping, M. Fiorentino, A. Coker, P. Kumar, and R. S. Windeler. "Four-Wave Mixing in Microstructure Fiber". Opt. Lett. 26, 1047 (2001).

H. K. Tsang, C. S. Wong, T. K. Liang, I. E. Day, S. W. Roberts, A. Harpin, J. Drake and M. Asghari. "Optical Dispersion, Two-Photon Absorption and Self-Phase Modulation in Silicon Waveguides at 1.5 µm Wavelength". Appl. Phys. Lett. 80, 416/418 (2002).

Hansryd, J., Andrekson, A., Westlund, M., Li, J. and Hedekvist, P. "Fiber-Based Optical Parametric Amplifiers and Their Applications". IEEE Select. Topics Quant. Electron. 8, 506-520 (2002).

J. E. Sharping, M. Fiorentino, P. Kumar, and R. S. Windeler. "Optical Parametric Oscillator BAsed on Four-Wave Mixing in Microstructure Fiber". Opt Lett. 27, 1675-1677 (2002).

M. J. Weber. "Silicon (Si)" and "Fused Silica ($SiO_2$)" in "Handbook of Optical Materials". CRC Press, Boca Raton (2003).

Dinu, M., Quochi, F., and Garcia, H. "Third-Order Nonlinearities in Silicon at Telecom Wavelengths". Appl. Phys. Lett. 82, 2954-2956 (2003).

Claps, R. Dimitropoulos, D., Raghunathan, V., Han, Y. and Jalali, B. "Observation on Stimulated Raman Amplification in Silicon Waveguides". Opt. Express 11, 1731-1739 (2003).

V. R. Almeida, R. R. Panepucci, and M. Lipson. "Nanotaper for Compact Mode Conversion". Opt. Lett. 28, 1302-1304 (2003).

W. H. Reeves, D. V. Skryabin, F. Biancalana, J. C. Knight, P. St. J. Russell, F. G. Omenetto, A. Efimov, and A. J. Taylor. "Transformation and Control of Ultra-Short Pulses in Dispersion-Engineered Photonic Crystal Fibres". Nature 424, 511-515 (2003).

M. A. Foster, K. D. Moll, and A. L. Gaeta. "Optimal Waveguide Dimensions for Nonlinear Interactions". Opt. Express 12, 2880-2887 (2004).

V. R. Almeida, C. A. Barrios, R. R. Panepucci, and M. Lipson. "All-Optical Control of Light on a Silicon Chip". Nature 481, 1081-1084 (2004).

L. Tong, J. Lou, and E. Mazur. "Single-Mode Guiding Properties of Subwavelength-Diameter Silica and Silicon Wire Waveguides". Opt. Express 12, 1025-1035 (2004).

Dimitropoulos, D., Raghunathan, V., Claps, R., and Jalali, B.. "Phase-Matching and Nonlinear Optical Processes in Silicon Waveguides". Opt. Express 12, 149-160 (2004).

Liang, T. K., and Tsang, H. K. "Role of Free Carriers from Two-Photon Absorption in Raman Amplification in Silicon-on-Insulator Waveguides". Appl. Phys. Lett. 84, 2745-2747 (2004).

Espinola, R. L., Dadap, J. I., Osgood, R. M. Jr., McNab, S. J., and Vlasov, Y. A. "Raman Amplification in Ultrasmall Silicon-on-Insulator Wire Waveguides". Opt. Express 12, 3713-3718 (2004).

Liu, A., Rong, H., Paniccia, M., Cohen, O., and Hak, D. "Net Optical Gain in a Low Loss Silicon-on-Insulator Waveguide by Stimulated Raman Scattering". Opt. Express 12, 4261-42686 (2004).

Rong, H. et al. "Raman Gain and Nonlinear Optical Absorption Measurements in a Low-Loss Silicon Waveguide". Appl. Phys. Lett. 85, 2196-2198 (2004).

Xu, Q., Almeida, V. R., and Lipson, M. "Time-Resolved Study of Raman Gain in Highly Confined Silicon-on-Insulator Waveguides". Opt. Express 12, 4437-4442 (2004).

Liang, T. K. and Tsang, H. K. "Efficient Raman Amplification in Silicon-on-Insulator Waveguides". Appl. Phys. Lett. 85, 3343-3345 (2004).

Boyraz, O. and Jalali, B. "Demonstration of 11 dB Fiber-to-Fiber Gain in a Silicon Raman Amplifier". Electron. Express 1, 429-434 (2004).

Xu, Q., Almeida, V. R. and Lipson, M. "Demonstration of High Raman Gain in a Submicrometer-Size Silicon-on-Insulator Waveguide". Opt. Lett. 30, 35-37 (2005).

Jones, R. et al. "Net Continuous Wave Optical Gain in a Low Loss Silicon-on-Insulator Waveguide by Stimulated Raman Scattering". Opt. Express 13, 519-525 (2005).

Rong, H. et al. "An All-Silicon Raman Laser". Nature 433, 292-294 (2005).

Rong, H. et al. "A Continuous-Wave Raman Silicon Laser". Nature 433, 725-728 (2005).

Jones, R. et al. "Lossless Optical Modulation in a Silicon-Waveguide Using Stimulated Raman Scattering". Opt. Express 13, 1716-1723 (2005).

Sharping, J. E. et al. "All-Optical, Wavelength and Bandwidth Perserving Pulse Delay Based on Parametric Wavelength Conversion and Dispersion". Opt. Express 13, 7872-7877 (2005).

Lin, Q. et al. "40-Gb/s Optical Switching and Wavelength Multicasting in a Two-Pump Parametric Device". IEEE Photon. Technol. Lett. 17, 2376-2378 (2005).

Y. A. Vlasov, M. O'Boyle, H. F. Hamann, and S. J. McNab. "Active Control of Slow Light on a Chip with Photonic Crystal Waveguides". Nature 438, 65-69 (2005).

V. Raghunathan, R. Claps, D. Dimitropoulos, and B. Jalali. "Parametric Raman Wavelength Conversion in Scaled Silicon Waveguides". J. Lightwave Technol. 23, 2094-2102 (2005).

M. A. Foster, A. L. Gaeta, Q. Cao, and R. Trebino. "Soliton-Effect Compression of a Supercontinuum to Few-Cycle Durations in Photonic Nanowires". Opt. Express 13, 6848-6855 (2005).

Li, X., Voss, P. L., Sharping, J. E. And Kumar, P. "Optical-Fiber Source of Polarization-Entangled Photons in the 1550 nm Telecom Band". Phys. Rev. Lett. 94, 053601 (2005).

H. Fuhuda, K. Yamada, T. Shoji, M. Takahashi, T. Tsuchizawa, T. Watanabe, J. Takahashi, and S. Itabashi. "Four-Wave Mixing in Silicon Wire Waveguides". Opt. Express 13, 4629-4637 (2005).

R. L. Espinola, J. I. Dadap, R. M. Osgood Jr., S. J. McNab, and Y. A Vlasov. "C-Band Wavelength Conversion in Silicon Photonic Wire Waveguides". Opt. Express 13, 4341-4349 (2005).

X. Chen, N. C. Panoiu, and R. M. Osgood, Jr. "Theory of Raman-Mediated Pulsed Amplification in Silicon-Wire Waveguides". IEEE J. Quantum Electron. 42, 160-170 (2006).

Turner, A. C. et al. "Tailored Anomalous-Group Velocity Dispersion in Silicon Channel Waveguides". Opt. Express 14, 4357-4362 (2006).

Okawachi, Y. et al. "All-Optical Slow-Light on a Photonic Chip". Opt. Express 14, 2317-2322 (2006).

Yamada, K. et al. "All-Optical Efficient Wavelength Conversion Using Silicon Photonic Wire Waveguide". IEEE Photon. Technol. Lett. 18, 1046-1048 (2006).

Rong, H., Kuo, Y. H., Liu, A., Paniccia, M. And Cohen, O. "High Efficiency Wavelength Conversion of 10 Gb/s Data in Silicon Waveguides". Opt. Express 14, 1182-1188 (2006).

Q. Lin, J. Zhang, P. M. Fauchet, and G. P. Agrawal. "Ultrabroadband Parametric Generation and Wavelength Conversion in Silicon Waveguides". Optics Express (2006).

M. A. Foster, A. C. Turner, J. E. Sharping, B. S. Schmidt, M. Lipson, and A. L Gaeta. "Broad-band Optical Parametric Gain on Silicon Photonic Chip" (2006).

L. Razzari, D. Duchesne, M. Ferrera, R. Morandotti, S. Chu, B. E. Little, and D. J. Moss. "CMOS-Compatible Integrated Optical Hyper-Parametric Oscillator". Nature Photonics (2009).

J. S. Levy, A. Gondarenko, M. A. Foster, A. C. Turner-Foster, A. L. Gaeta, and M. Lipson. "CMOS-Compatible Multiple-Wavelength Oscillator for On-Chip Optical Interconnects". Nature Photonics (2009).

* cited by examiner

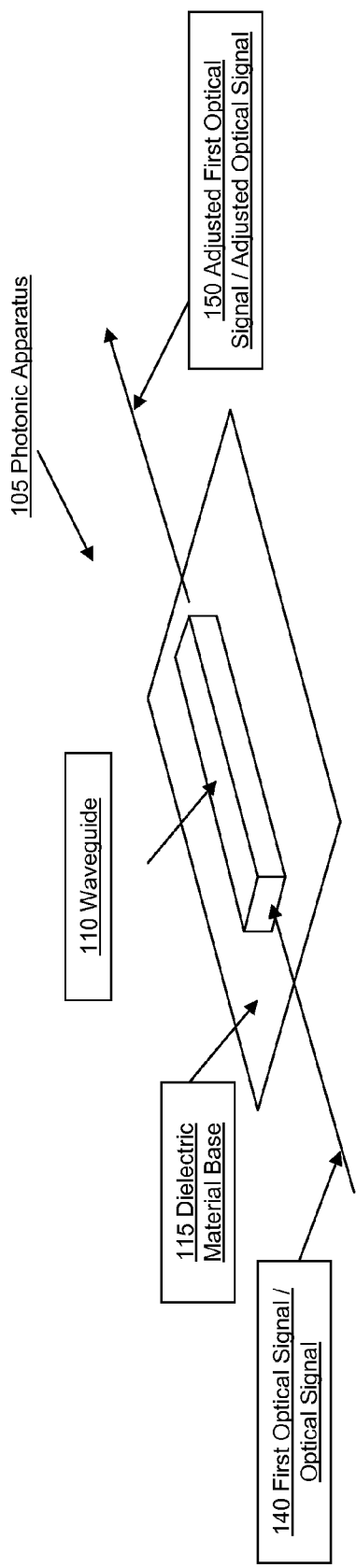
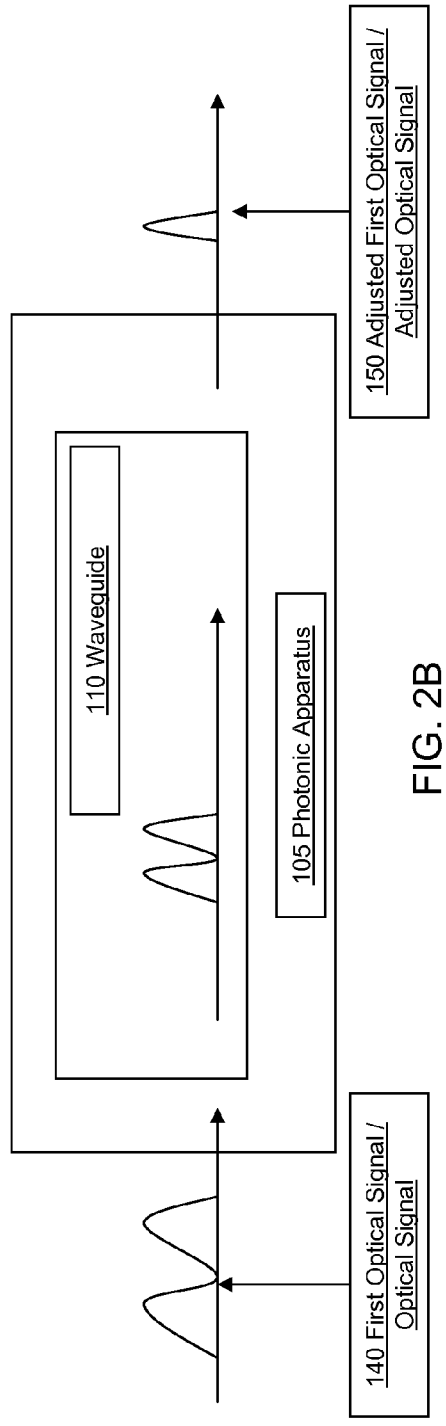
FIG. 2A
FIG. 2B

SILICON INTEGRATED PHOTONIC OPTICAL PARAMETRIC AMPLIFIER OSCILLATOR AND WAVELENGTH CONVERTER

RELATED APPLICATIONS

This application is a continuation of and claims priority to U.S. application Ser. No. 12/056,224, entitled "Silicon Integrated Photonic Optical Parametric Amplifier, Oscillator and Wavelength Converter," and filed on Mar. 26, 2008, which is incorporated herein by reference in its entirety. U.S. application Ser. No. 12/056,224 claims priority to and the benefit of U.S. Provisional Application No. 60/908,002, entitled "Silicon Integrated Photonic Optical Parametric Amplifier, Oscillator and Wavelength Converter," and filed on Mar. 26, 2007, which is incorporated herein by reference in its entirety.

GOVERNMENT SUPPORT

This invention was made with Government support under DARPA Grant No. N000014-05-1-053 and under NSF/Center for Nanoscale Systems Grant No. NSF-117770. The United States Government has certain rights in the invention.

FIELD OF THE INVENTION

The present application generally relates to optical signal processing and amplification. More specifically, the present application relates to systems, methods and apparatuses for wavelength shifting, phase matching and amplification of optical signals performed by a semiconductor photonic device.

BACKGROUND OF THE INVENTION

When an optical wave, emitted from a monochromatic light source such as a laser, travels through a medium it is subject to a variety of effects created by the medium. Such effects are sometimes induced by the natural material characteristics which may create technical difficulties in optical transmission systems.

In telecommunications, where optical information is often transmitted via optical fibers, degradation in optical signal, such as pulse spreading or distortion, are often attributed to the dispersions created by the medium. One such dispersion is called a material dispersion which causes spreading of an optical signal pulse traveling through the medium due to the material property of the medium. When dispersed, some signal wavelengths travel faster than other wavelengths of the same signal. In addition to the material dispersion, waveguide dispersion further degrades the signal due to the signal spreading caused by the geometries and the sizes of waveguides. Furthermore, as the optical signal is spread due to the dispersion, the amplitude of the optical signal is also degraded. All these effects combined often define limitations to the efficiency of many transmission systems.

BRIEF SUMMARY OF THE INVENTION

The present solution addresses these limitations by providing systems, methods and apparatuses for amplifying optical signals over a broad range of wavelengths, correcting for the signal experienced dispersion and even converting the wavelength of an optical signal. More precisely, the present disclosure is directed towards systems, methods and apparatuses for optical signal intensity adjustment or light signal amplification, optical signal wavelength adjustment or light wavelength conversion and optical signal phase adjustment or phase shifting.

In some aspects the present invention relates to systems and methods for adjusting by a photonic apparatus higher frequency and low frequency components of an optical signal. The systems and methods disclose a photonic apparatus which receives an optical signal comprising a lower frequency component and a higher frequency component. The photonic apparatus receives the lower frequency component an amount of time prior to the higher frequency component. The systems and methods further disclose a waveguide of the photonic apparatus. The waveguide provides an anomalous group velocity dispersion within the range of 0 picoseconds per nanometer of wavelength and kilometer of distance and about 1856 picoseconds per nanometer of wavelength and kilometer of distance. The systems and methods disclose the waveguide adjusting, in response to the anomalous group velocity dispersion, the amount of time between the higher frequency component and the lower frequency component of the optical signal. The systems and methods also disclose the photonic apparatus emitting the adjusted optical signal.

In some embodiments, the systems and methods disclose the waveguide adjusting, in response to the anomalous group velocity dispersion, the amount of time between the higher frequency component and the lower frequency component of the optical signal such that the amount of time is decreased.

In a number of embodiments, the systems and methods disclose the waveguide mixing the optical signal with a second optical signal, wherein the second optical signal is different from the optical signal. The systems and methods also disclose the second optical signal comprising a second higher frequency component and a second lower frequency component, wherein the photonic apparatus receives the second lower frequency component a second amount of time prior to the second higher frequency component. In some embodiments, the waveguide, in response to the mixing and providing of the anomalous group velocity dispersion adjusts one of the higher frequency component in respect to the lower frequency component or the second higher frequency component in respect to the second lower frequency component, such that the amount of time or the second amount of time, respectively, is decreased. In such embodiments, the photonic apparatus emits at least one of the adjusted optical signal or the adjusted second optical signal.

In a plurality of embodiments, systems and methods disclose the waveguide, in response to the anomalous group velocity dispersion, adjusting the amount of time between the higher frequency component and the lower frequency component of the optical signal such that the amount of time is zero or substantially close to zero.

In some embodiments, the waveguide mixes the optical signal with a second optical signal, wherein the second optical signal is different from the optical signal. The second optical signal comprises a second higher frequency component and a second lower frequency component, such that the photonic apparatus receives the second lower frequency component a second amount of time prior to the second higher frequency component. The systems and methods, in a number of embodiments also disclose the waveguide, in response to mixing and providing of anomalous group velocity dispersion, adjusting one of the higher frequency component in respect to the lower frequency component such that the amount of time is zero or substantially close to zero. The systems and methods, in a number of embodiments also disclose the waveguide, in response to mixing and providing of anomalous group velocity dispersion, adjusting the second higher frequency component in respect to the second lower frequency component such that the second amount of time is zero or substantially close to zero. The systems and methods, in a number of embodiments, also disclose the photonic apparatus emitting one of the adjusted optical signal or the adjusted second optical signal.

In some embodiments, systems and methods disclose the waveguide adjusting, in response to the anomalous group velocity dispersion, the amount of time between the higher frequency component and the lower frequency component of the optical signal such that the higher frequency component propagates a new amount of time prior to the lower frequency component. In a number of embodiments, systems and methods disclose the waveguide mixing the optical signal with a second optical signal, wherein the second optical signal is different from the optical signal. The second optical signal comprises a second higher frequency component and a second lower frequency component, and the photonic apparatus receives the second lower frequency component a second amount of time prior to the second higher frequency component. The systems and methods further disclose the waveguide adjusting, in response to mixing and providing of the anomalous group velocity dispersion, the higher frequency component in respect to the lower frequency component such that the higher frequency component propagates a new amount of time prior to the lower frequency component. In some embodiments, the systems and methods disclose the waveguide adjusting, in response to the mixing and providing of the anomalous group velocity dispersion, the second higher frequency component in respect to the second lower frequency component such that the second higher frequency component propagates a new amount of time prior to the second lower frequency component. In some embodiments, the systems and methods disclose the photonic apparatus emitting the adjusted optical signal or the adjusted second optical signal.

In a plurality of embodiments the systems and methods disclose adjusting the optical signal by the photonic apparatus such that the optical signal is delayed. In some embodiments, the systems and methods disclose adjusting the optical signal such that the shape of the optical signal is changed, altered or adjusted. In a number of embodiments, the systems and methods disclose a waveguide comprising a semiconductor material, such as a silicon or a germanium. The semiconductor material may have crystalline structure. In some embodiments, the systems and methods disclose the first optical signal or the second optical signal comprising one of a monochromatic light or a polychromatic light.

In some aspects, the present invention relates to systems and methods for adjusting, by a photonic apparatus, one of intensity or power of one or more optical signals. The systems and methods disclose a photonic apparatus receiving a first optical signal and a second optical signal, wherein the second optical signal is different from the first optical signal. The systems and methods also disclose a waveguide of the photonic apparatus providing an anomalous group velocity dispersion for one of the first optical signal or the second optical signal. The systems and methods further disclose the waveguide, in response to the anomalous group velocity dispersion, adjusting one of intensity or power of at least one of the first optical signal or the second optical signal and the photonic apparatus emitting at least one of the adjusted first optical signal or the adjusted second optical signal.

In some embodiments, the waveguide performs mixing of the first optical signal and the second optical signal. In a number of embodiments, the waveguide adjusts, in response to the mixing, the intensity of at least one of the first optical signal or the second optical signal. In certain embodiments, the systems and methods disclose the waveguide providing a third optical signal in response to the receiving the first and the second optical signals and emitting, by the photonic apparatus, the third optical signal.

In a plurality of embodiments, systems and methods disclose the waveguide adjusting the wavelength of a portion of the second optical signal to the wavelength of the first optical signal. In some embodiments, systems and methods disclose the waveguide delaying one of the first optical signal or the second optical signal. In a number of embodiments, the systems and methods disclose reshaping, by the waveguide, of one of the first optical signal or the second optical signal. In some embodiments, the systems and methods disclose the waveguide comprising a semiconductor material, such as a silicon, a germanium and being interfaced with a dielectric material such as a silicon dioxide. In a number of embodiments, the systems and methods disclose the first optical signal and the second optical signal comprising one of a monochromatic light or a polychromatic light.

In some aspects, the present invention relates to systems and methods for adjusting, by a photonic apparatus, a wavelength of an optical signal over a range of wavelengths. The systems and methods disclose an photonic apparatus receiving a first optical signal having a first wavelength and a second optical signal having a second wavelength. The systems and methods also disclose a waveguide of the photonic apparatus providing an anomalous group velocity dispersion for at least one of the first optical signal or the second optical signal. The systems and methods also disclose the waveguide, in response to the anomalous group velocity dispersion, adjusting the second wavelength of a portion of the second optical signal to the first wavelength of the first optical signal and the photonic apparatus emitting one of the adjusted first optical signal or the adjusted second optical signal.

In some embodiments, the systems and methods disclose the waveguide mixing the first optical signal and the second optical signal. In a number of embodiments, the systems and methods disclose the waveguide adjusting, in response to mixing, the second wavelength of a portion of the second optical signal to the first wavelength of the first optical signal. In a plurality of embodiments, the systems and methods disclose the waveguide providing a third optical signal in response to the receiving the first and the second optical signals. The systems and methods, in some embodiments, also disclose the waveguide adjusting the intensity or the power of one of the first optical signal or the second optical signal.

Any embodiment or embodiments mentioned or described may be combined with any other embodiment or embodiments mentioned or described to create any other variation or a combination of an embodiment of the disclosure or the invention. The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 2A is a block diagram illustrating an environment of a waveguide;

FIG. 2B is a block diagram illustrating some embodiments of a photonic apparatus for optical signal phase shifting or phase adjustment;

Figure 1A:
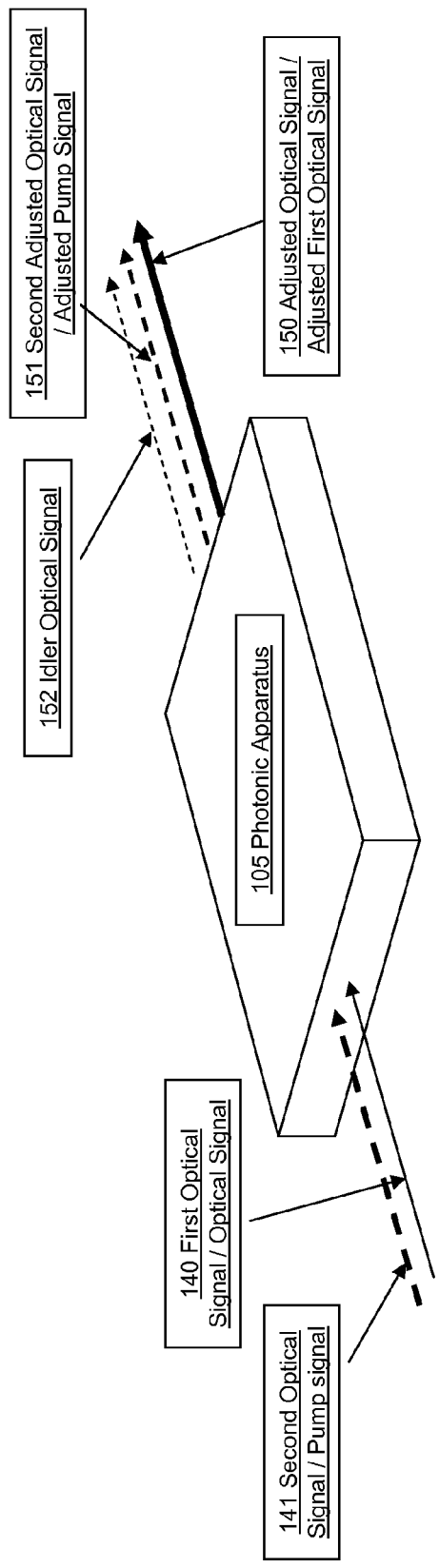
FIG. 1A is a block diagram illustrating embodiments of a photonic apparatus.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes the environment and the system components for practicing embodiments of the present invention;

Section B describes embodiments for methods for phase adjustment;

Section C describes embodiments for methods of optical signal intensity or power adjustment by the photonic apparatus; and Section D describes embodiments for methods of wavelength adjustment by the photonic apparatus.

A. The System Components and Environment

Prior to discussing specific embodiments of systems and methods relating to the present invention, it may be helpful to discuss the general environment in which the present invention may be used. One such environment may include an optical communication system used in an industry such as, for example, the telecommunication industry. Optical communications may be implemented via variety of mediums, such as, for example, optical fibers or other waveguides.

In some applications, an optical signal may be emitted from a monochromatic light source and coupled into a wave-guiding medium, such as for example an optical fiber or some other waveguide. The wave-guiding medium often comprises materials which induce material specific effects onto the optical signal propagating through them creating optical signal degradation. Material specific effects may include various optical signal degrading features such as the material dispersion, material impurities or contaminants. Even in the absence of the impurities and contaminants, material dispersion of the wave-guiding medium causes spreading of an optical signal propagating through the medium because the material dispersion causes some signal wavelengths of the optical signal to travel faster than signal wavelength. Therefore, as the optical signal is propagating over a long distance, the optical signal starts to spread.

In addition to the material dispersion, the geometrics of the waveguides used for guiding the optical signals may also induce an additional source of degradation of an optical signal called a waveguide dispersion. Waveguide dispersion further degrades the signal due to the signal spreading caused by the geometries and the sizes of waveguides. As the optical signal is spread due to the material and waveguide dispersion, the amplitude of the optical signal is also degraded and this may cause various failures especially in communication systems. The present invention might therefore be deployed in this type of environment in order to address these issues.

Referring now to FIG. 1A, an example of an environment wherein the present invention may be utilized is presented. FIG. 1A depicts a photonic apparatus 105 receiving two optical signals: the first optical signal 140, which is also referred to as the optical signal 140 and second optical signal 141, which may be also referred to as pump signal 141. FIG. 1A also illustrates three optical signals emitted from the photonic apparatus 105. The three emitted signals are: adjusted optical signal 150, which may also be referred to as adjusted first optical signal 150, adjusted second optical signal 151, also referred to as adjusted pump signal 151 and idler optical signal 152. In a number of embodiments, these optical signals are affected, changed and processed within the photonic apparatus 105. For the purpose of clearer description, the terms optical signal, signal, electromagnetic wave or an optical wave may herein be used interchangeably. Also the terms photonic and optic or optical may also be used interchangeably, as may the photonic apparatus or photonic structure.

Optical signals, such as first optical signal 140, second optical signal 141, adjusted first optical signal 150, adjusted second optical signal 151 or a idler optical signal 152 may often be referred to as the inputs or outputs of the photonic apparatus 105. Optical signals herein are generally referred to any type of optical or electromagnetic wave of any wavelength range and any intensity, power or variation of intensity and/or power. Sometimes optical signals may be referred to monochromatic optical signals, such as, for example the optical signals emitted from a laser or a laser diode. Some optical signals may be referred to as polychromatic optical signals, having a plurality of wavelength, such as, for example the light emitted by a semiconductor light emitting diode. Some optical signals may have a constant intensity or power while others may be periodic. Sometimes, in some applications optical signals are transmitted via short pulses of monochromatic light. Optical signals, may also comprise higher frequency components which are components of the signal having shorter wavelength in relation to other components of the same signal and lower frequency components which are components of the optical signal having longer wavelengths in relation to other components of the same signal. The present application uses these terms in various ways which will be described further in more details below.

Photonic apparatus 105 is any photonic structure capable of adjusting, changing, enhancing or monitoring an optical wave, an electromagnetic wave or an optical signal. In some embodiments, photonic apparatus 105 comprises a waveguide receiving or coupling an optical wave or an optical signal. Photonic apparatus 105 is capable of receiving or coupling an optical signal, adjusting the received or the coupled optical signal and emitting the adjusted optical signal. In a plurality of embodiments, photonic apparatus 105 comprises a waveguide guiding an optical signal within the waveguide structure. The waveguide of the photonic apparatus 105 may comprise any number of materials, such as, for example, dielectrics, semiconductors, metals, organic materials, inorganic materials, or any material or medium capable of transmitting an electromagnetic wave, light or an optical signal.

Photonic apparatus 105 may also comprise a structure or a device for inducing an optical resonance effect for an optical signal. In some embodiments, photonic apparatus 105 comprises one or more three dimensional waveguide structures having sizes or shapes which create an optical interference between two or more optical signals or optical waves. In a number of embodiments, photonic apparatus 105 comprises parametric oscillators generating coherent optical signals at wavelengths different than the pump signal 141. In a plurality of embodiments, photonic apparatus 105 comprises a parametric wavelength converter which converts the wavelength of one input signal to a wavelength of another signal. In some embodiments, photonic apparatus 105 comprises an emitter, an interface, a lens comprising a semiconductor material, a glass lens, a section of a waveguide or a waveguide for emitting an optical signal or a plurality of optical signals.

Photonic Apparatus 105, in a number of embodiments, comprises an optical amplifier increasing, decreasing, or otherwise adjusting the intensity or the power of an optical signal. In some embodiments, the optical amplifier is a waveguide. In a plurality of embodiments, photonic apparatus 105 comprises a device or a structure changing or adjusting a wavelength of an input optical signal to different wavelength. In a number of embodiments, the device or a structure changing or adjusting a wavelength of an input optical signal to a different wavelength is a waveguide. In some embodiments, photonic apparatus 105 comprises a device or structure adjusting or changing the phase of the input optical signal to a different phase. In a number of embodiments, the device or structure adjusting or changing the phase of the input optical signal to a different phase is a waveguide. In a plurality of embodiments, photonic apparatus 105 comprises a device or a structure propagating a portion of an optical signal having a higher frequency faster than a portion of the optical signal having a lower frequency. In some embodiments, the device or a structure propagating a portion of an optical signal having a higher frequency faster than a portion of the optical signal having a lower frequency is a waveguide. In a number of embodiments, photonic apparatus 105 comprises a device or a structure propagating a portion of an optical signal having a lower frequency faster than a portion of an optical signal having a higher frequency. In many embodiments, the device or a structure propagating a portion of an optical signal having a lower frequency faster than a portion of an optical signal having a higher frequency is a waveguide.

Photonic apparatus 105 may sometimes comprise one or more devices, structures or components performing specific tasks or functions. In certain embodiments, photonic apparatus 105 comprises an optical switch switching an optical signal on or off. In some embodiments, photonic apparatus 105 comprises an optical delay delaying an optical signal by an amount of time and emitting the delayed optical signal. In a plurality of embodiments, photonic apparatus 105 comprises a light source emitting a monochromatic light or a polychromatic light. Sometimes, photonic apparatus 105 comprises an optical signal regenerator receiving an optical signal, adjusting or increasing the intensity or power of the optical signal or amplifying the optical signal and then emitting the adjusted or amplified optical signal. In some embodiments, photonic apparatus 105 comprises a device or a structure performing wave mixing of a plurality of optical signals, such as, for example four-wave. In a number of embodiments, photonic apparatus 105 comprises a device or a structure which causes an optical signal having a wavelength to divide into two additional signals, upon interacting with the device or the structure. The new sum of the wavelengths of the two additional signals equals the wavelength of the original optical signal. Sometimes, photonic apparatus 105 mixes the two additional signals with another optical signal in order to perform a wavelength conversion or optical signal intensity or power adjustment, such as optical signal amplification.

In some embodiments, photonic apparatus 105 comprises an optical coupler, receiver or an interface for receiving or coupling an optical signal into the photonic apparatus 105 or into the waveguide. The waveguide of the photonic apparatus 105 may, in some embodiments, be referred to as the waveguide. In some embodiments, the optical coupler may comprise an area comprising a semiconductor material or a dielectric material positioned underneath the waveguide structure. In a number of embodiments, an optical coupler is an area or a section of an optical waveguide. In a plurality of embodiments, an optical coupler comprises a separate section of the photonic apparatus 105 specifically shaped to couple an optical signal of a specific wavelength range.

Photonic apparatus 105, in a number of embodiments, comprises a waveguide comprising a semiconductor material, such as silicon, germanium. In a certain embodiments, the waveguide comprises more than one material. In some embodiments, photonic apparatus 105 comprises a waveguide comprising glass or glass silica or an optical fiber. In a plurality of embodiments, photonic apparatus 105 comprises a waveguide shaped like a cubical structure, a cylindrical structure, a triangular structure, or a structure comprising any number of shapes, sizes, flat or curved surfaces features or areas, fins or grooves. The semiconductor material may be in a crystal form or in a raw form and it may or may not be implanted or otherwise processed.

In some embodiments, the waveguide of the photonic apparatus 105 may also be referred to as waveguide 110. In some embodiments, the waveguide 110 may be referred to as the waveguide 110. In a plurality of embodiments, the waveguide 110 of the photonic apparatus 105 comprises a semiconductor material. In a number of embodiments, the waveguide 110 of the photonic apparatus 105 comprises a three dimensional structure having a height, width and length. In some embodiments, the cross-sectional area of the width and height is defined as the area calculated by multiplying the width of the waveguide 110 by the height of the waveguide 110. In a plurality of embodiments, the cross-sectional area of the width and height is within the range of 0.09 micrometers squared and 0.56 micrometers squared. In a plurality of embodiments, the height of the waveguide and the width of the waveguide may be of any value as long as the cross-sectional area is within the range of 0.09 micrometers squared and 0.56 micrometers squared. In a plurality of embodiments, the waveguide of the photonic apparatus 105 provides or forms an anomalous group velocity dispersion for a range of optical signals. In a number of embodiments, the waveguide of the photonic apparatus 105, also known as the waveguide, provides or forms an anomalous group velocity dispersion for a range of optical signals having a wavelength between 1.2 micrometers and over 2.0 micrometers. In some embodiments, the waveguide 110, also referred to as the waveguide 110, provides or forms an anomalous group velocity dispersion in the range of between 0 picoseconds per nanometer of wavelength and kilometer of distance and about 1856 picoseconds per nanometer of wavelength and kilometer of distance. In a plurality of embodiments, the waveguide provides or forms an anomalous group velocity dispersion for the first optical signal 140 or the second optical signal 141.

FIG. 1A also illustrates an embodiment of the photonic apparatus receiving two optical input signals and outputting three optical output signals. The input signals are a first optical signal 140, also referred to as the optical signal, and a second optical signal 141, also referred to as the pump signal. The output signals are an adjusted first optical signal 150, which may also be referred to as adjusted optical signal, an adjusted second optical signal 151, which may also be referred to as adjusted pump signal and an idler optical signal 152. Any of these optical signal inputs or outputs may be monochromatic or polychromatic optical signals. In some embodiments, any of the optical signals 140, 141, 150, 151 or 152 comprise any range of optical intensities or any wavelength range. In some embodiments, any of the optical signals 140, 141, 150, 151 or 152 is a pulsed optical signal, continuous wave optical signal, intensity or power varying optical signal or a wavelength varying optical signal. In a number of embodiments, any of the optical signals 140, 141, 150, 151 or 152 is a coherent optical wave signal or an incoherent optical wave signal. In some embodiments, any of the optical signals 140, 141, 150, 151 or 152 is an optical signal having higher frequency components of the optical signal propagating a amount of time or an amount of space ahead of the lower frequency components of the same optical signal. In a plurality of embodiments, any of the optical signals 140, 141, 150, 151 or 152 is an optical signal having lower frequency components of the optical signal propagating an amount of time or a finite amount of space ahead of the higher frequency components of the same optical signal. In some embodiments, any of the optical signals 140, 141, 150, 151 or 152 is an optical signal distorted by a dispersion such as a material dispersion, spatial dispersion or a waveguide dispersion.

In some embodiments, photonic apparatus 105 or waveguide 110 adjusts a phase angle of two electromagnetic waves. In some embodiments, a single optical signal may comprise two electromagnetic waves being a theta phase angle different from each other in terms of phase. The theta phase angle indicates a difference in phases between two electromagnetic waves. The theta phase angle may be in a range between 0 and 360 degrees. In some embodiments, an optical signal comprising two electromagnetic waves having a theta phase angle difference between each other is adjusted by the photonic apparatus 105 or waveguide 110. The phase angle between two electromagnetic waves may be changed or adjusted to a different theta phase angle, which may be a zero phase angle, a 180 degree phase angle or any phase angle which may be predetermined by photonic apparatus 105 or waveguide 110. In a plurality of embodiments, anomalous group velocity dispersion provided or formed by a specific size or shape of waveguide 110 adjusts the theta phase angle to a different phase angle. In some embodiments, anomalous group velocity dispersion provided or formed by waveguide 110 adjusts the theta phase angle to a different phase angle. In a number of embodiments, mixing or four-wave mixing provided or formed by a specific size or shape of waveguide 110 adjusts the theta phase angle to a different phase angle. In some embodiments, mixing or four-wave mixing provided or formed by waveguide 110 adjusts the theta phase angle to a different phase angle. In a plurality of embodiments, anomalous group velocity dispersion combined with mixing or four-wave mixing which are provided or formed by a specific size or shape of waveguide 110 adjusts the theta phase angle to a different phase angle. In some embodiments, anomalous group velocity dispersion combined with mixing or four-wave mixing which are provided or formed by waveguide 110 adjusts the theta phase angle to a different phase angle. In a number of embodiments, photonic apparatus 105 or waveguide 110 changes or adjusts a theta phase angle to a different phase angle, wherein the different phase angle is a predetermined value. In some embodiments, photonic apparatus 105 or waveguide 110 changes or adjusts the theta phase angle such that the two match or substantially match or match within a predetermined threshold.

In some embodiments, optical signals used herein, both inputs and outputs, may have a continuous intensity, power or a varying intensity and/or power. In some embodiments, optical signals are derived from a femtosecond optical parametric oscillator. In a number of embodiments, optical signals are derived from a parametric oscillator centered at 1550 nanometer wavelength with a 75 megahertz repetition rate for optical pulse or optical signal emission. The pulses of the optical signal may be filtered to 1.5 nanometer bandwidth range or any bandwidth range 0 nanometers to 1000 micrometers. In some embodiments, the optical signals are tunable from 1510 nanometers to 1590 nanometers. In a number of embodiments, optical signals have signal pulses in the range of 2.4 picoseconds to 3.5 picoseconds. In a plurality of embodiments, optical signals have signal pulses in the range of 1 femtosecond to 100 milliseconds.

In a number of embodiments, photonic apparatus 105 may adjust, process or change any of the input signals to produce any of the output signals. In a plurality of embodiments, the adjusted first optical signal 150 is the first optical signal 140 adjusted, changed, processed or otherwise affected by the photonic apparatus 105. In some embodiments, adjusted first optical signal 150 comprises all of the components of the first optical signal 140. In a number of embodiments, adjusted first optical signal 150 comprises some or a fraction of components of the first optical signal 140. In a plurality of embodiments, adjusted optical signal 150 comprises no components of the first optical signal 140, but instead adjusted optical signal 150 is created by the photonic apparatus 105 using the first optical signal 140.

In some embodiments, first optical signal 140 is adjusted by the photonic apparatus 105 such that the adjusted first optical signal 150 has a higher intensity or power than the first optical signal 140. In a number of embodiments, first optical signal 140 is adjusted by the photonic apparatus 105 such that the wavelength of the adjusted first optical signal 150 is different than the wavelength of the optical signal 140. In some embodiments, first optical signal 140 is adjusted by the photonic apparatus 105 such that the spectral range of the adjusted first optical signal 150 is changed in respect to the first optical signal 140.

In a plurality of embodiments, first optical signal 140 comprising higher frequency components and lower frequency components wherein the higher frequency components propagate an amount of time prior to the lower frequency components is adjusted by the photonic apparatus 105 such that the amount of time is changed, decreased, increased, cancelled or made equal to zero. Sometimes, the amount of time is referred to as the amount of time. In some embodiments, first optical signal 140 is adjusted by the photonic apparatus 105 such that the amount of time is decreased. In such embodiments, the higher frequency components and the lower frequency components of the first optical signal 140 are adjusted relative to each other such that the full width at half maximum of the first optical signal 140 is larger than the full width at half maximum of the adjusted first optical signal 150. In some embodiments, first optical signal 140 is adjusted by the photonic apparatus 105 such that the amount of time is reduced to be substantially equal to zero. In such embodiments, the higher frequency components and the lower frequency components of the first optical signal 140 are adjusted relative to each other such that the full with half maximum of the first optical signal 150 has higher frequency components and lower frequency components lined up to within the range of full width half maximum of the first optical signal 140 before being distorted by the dispersion.

Still referring to FIG. 1A, the second optical signal 141 or a pump signal, in a number of embodiments, comprises each and every feature, element or embodiment of the first optical signal 140. In other embodiments, the second optical signal 141 comprises different features, elements or embodiments from the first optical signal 140. In a plurality of embodiments, second optical signal 141 is used for adjusting, enhancing, amplifying or otherwise changing of the first optical signal 140. In a number of embodiments, first optical signal 140 is used for adjusting, enhancing, amplifying or otherwise changing the second optical signal 140. In some embodiments, second optical signal 141 is an optical signal having a specific intensity or power, specific wavelength or specific pulsing variations for creating non linear effects within the photonic apparatus 105. In such embodiments, the non linear effects may be used to induce effects on the first optical signal 140 or the second optical signal 141 such as four-wave mixing, parametric amplification, wavelength shifting, phase matching or phase adjustment.

Phase adjustment is sometimes referred to as adjustment of the higher frequency components of any optical signal in respect to the lower frequency components of the same optical signal. Mixing of two or more optical signals may also be referred to as the four-wave mixing. Mixing may also be described as an intermodulation distortion in an optical system, wherein three signals, each having a different wavelength, interact inside a non-linear medium or under a non-linear regime of a medium giving a rise to a new optical signal having a fourth wavelength. The fourth signal' fourth wavelength, in some embodiments, is different from any of the wavelengths of the three signals. In some embodiments, the fourth signal's wavelength is the same wavelength as one of the three signals. Mixing is sometimes induced by a waveguide structure, such as the waveguide 110, in a way to form an additional optical signals or increase the intensity or power of an existing optical signal. Optical signals used in mixing may sometimes have wavelengths which are affected by a shape of a waveguide within which the mixing has occurred, the material of the waveguide, the electric field within the waveguide. Parametric amplification is sometimes referred to as an amplification of any optical signal using the process of optical parametric generation. Optical parametric generation utilizes an incident optical signal input and creates two additional optical signals whose sum energy equals the energy of the incident optical signal input. In the parametric amplification, the non linear effects of the medium may be used together with the effects from the optical parametric generation to affect a signal to be amplified and adjust its intensity or power. The non linear effects may be induced by the specific sizes and shapes of the waveguides as well as the intensities of the pump signals and pulsation of the input.

Furthermore, as the optical signal splits into two additional optical signals, under optical parametric generation, the two optical signals, in addition to the remaining portion of the original signal may mix with another optical signal within a waveguide 110 producing a fourth signal having another wavelength of light. In a number of embodiments, the fourth signal may comprise a wavelength which is identical to the wavelength of a first optical signal 140 or a second optical signal 141. In such cases, the fourth signal may become a component of or turn into a portion of the first optical signal 140 or a second optical signal 141, which may amplify optical signals 140 and 141. In some embodiments, the mixing of the two additional signals with another optical signal, while the waveguide 110 induces an anomalous group velocity dispersion, may result in optical amplification or optical signal intensity or power increase, wavelength conversion or wavelength adjustment, and phase shifting or phase adjustment.

In a plurality of embodiments, second optical signal 141 is aligned to the photonic apparatus 105 under a specific angle which may be defined by the crystalline structure of the material comprising the photonic apparatus 105, to enable the optical parametric generation. In some embodiments, the power or the intensity of the second optical signal 141 decreases as it propagates though the photonic apparatus 105 or through a waveguide of the photonic apparatus 105. In a plurality of embodiments, a portion of the second optical signal 141 transforms its wavelength to a wavelength of the first optical signal 140, thus decreasing the intensity or power of the second optical signal 141 and increasing the intensity or power of the first optical signal 140.

In some embodiments, a portion of the second optical signal 141 assists, enables, induces or contributes to the amplification of the first optical signal 141 via mixing, such as, for example four-wave mixing, within the photonic apparatus 105 or a waveguide within photonic apparatus 105. In a number of embodiments, a portion of the second optical signal 141 assists, enables, induces or contributes to the amplification of the first optical signal 140 via parametric amplification within the photonic apparatus 105 or a waveguide within photonic apparatus 105. In a plurality of embodiments, a portion of the second optical signal 141 assists, enables, induces or contributes to the wavelength conversion of an optical signal different than the first optical signal 141 to the wavelength of the first optical signal 141 via four-wave mixing, or mixing within the photonic apparatus 105 or a waveguide within photonic apparatus 105. In certain embodiments, a portion of the second optical signal 141 assists, enables, induces or contributes to the wavelength conversion of an optical signal different than the first optical signal 140 to the wavelength of the first optical signal 140 via parametric amplification within the photonic apparatus 105 or a waveguide within photonic apparatus 105. In certain embodiments, a portion of the second optical signal 141 assists, enables, induces or contributes to the adjustment of the higher frequency components of the first optical signal 140 in relation to the lower frequency components of the first optical signal 140 via parametric amplification within the photonic apparatus 105 or a waveguide within photonic apparatus 105. In certain embodiments, a portion of the second optical signal 141 assists, enables, induces or contributes to the adjustment of the higher frequency components of the first optical signal 140 in relation to the lower frequency components of the first optical signal 140 via mixing, within the photonic apparatus 105 or a waveguide within photonic apparatus 105.

Mixing may adjust, change or affect any one of the adjusted first optical signal 150, adjusted second optical signal 151 or optical idler signal 152. Adjusted second optical signal 151 may be a second optical signal 141 adjusted, changed, processed or otherwise affected by the photonic apparatus 105. Adjusted first optical signal 150 may be a first optical signal 140 adjusted, changed processed or otherwise affected by the photonic apparatus 105. In some embodiments, adjusted second optical signal 151 comprises a fraction or a portion of the second optical signal 141 or the first optical signal 140. In some embodiments, adjusted first optical signal 150 comprises a fraction or a portion of the first optical signal 140 or the second optical signal 141. In a number of embodiments, optical idler signal 152 comprises a portion of adjusted, processed, distorted or changed second optical signal 141 or first optical signal 150. In some embodiments, adjusted second optical signal is a second optical signal 141 having adjusted intensity or power, wavelength, wavelength spectrum, phase or adjusted higher and lower frequency components.

Idler optical signal 152 is sometimes referred to as one of the two additional optical signals formed when a second optical signal 141 upon interacting with a medium forms two optical signals whose sum of energies equal the energy of the second optical signal 141. In some other embodiments, idler optical signal is referred to as a byproduct of the interaction between the first optical signal 140 and the second optical signal 141 within the photonic apparatus 105 or a waveguide within the photonic apparatus 105. Although FIG. 1A and other figures may show multiple inputs and multiple outputs, the photonic apparatus 105 may have any combination of one or more inputs and one or more outputs.

In some embodiments, the present invention combines various embodiments and various features of the present invention to produce a new result. In a number of embodiments, photonic apparatus 105 amplifies an optical signal over a broad wavelength range. In a number of embodiments, photonic apparatus 105 amplifies an optical signal over a broad wavelength range using a waveguide forming an anomalous group velocity dispersion for a second optical signal 151 and a first optical signal 150 and using mixing of the second optical signal 151. In some embodiments, photonic apparatus 105 amplifies an optical signal over a broad wavelength range using a waveguide forming an anomalous group velocity dispersion for a second optical signal 151 and a first optical signal 150 and using mixing of the second optical signal 151. In certain embodiments, photonic apparatus 105 or waveguide 110 produces a mixing gain or a four-wave mixing gain for optical signals whose wavelength range is below 1510 nanometers and above 1590 nanometers.

In some embodiments, photonic apparatus 105 or waveguide 110 produces, provides or forms an optical gain which amplifies optical signals by providing mixing or anomalous group velocity dispersion for optical signals within the wavelength range is below 1510 nanometers and above 1590 nanometers. In a plurality of embodiments, photonic apparatus 105 or waveguide 110 produces, provides or forms an optical gain which amplifies optical signals by providing mixing or anomalous group velocity dispersion for optical signals within the wavelength range is below 1510 nanometers and above 1590 nanometers. In some embodiments, photonic apparatus 105 or waveguide 110 produces, provides or forms an optical gain which amplifies optical signals by providing mixing or anomalous group velocity dispersion for optical signals within a wavelength range of 100 nanometers, wherein the wavelength range may be anywhere on a wavelength spectrum. In some embodiments, the wavelength range of 100 nanometers associated with the optical gain may cover any 100 nanometers of wavelength range anywhere on optical or wavelength spectrum for signals of any wavelength from single digit nanometer wavelengths to 100 micrometer wavelengths. In a number of embodiments, photonic apparatus 105 or waveguide 110 produces, forms or provides an optical gain for any optical signal having a wavelength between 0 and 50 nanometers shorter than the wavelength of the pump signal 141. In some embodiments, photonic apparatus 105 or a waveguide 110 produces an optical gain for any optical signal having a wavelength between 0 and 50 nanometers longer than the wavelength of the pump signal 141. In a number of embodiments, photonic apparatus 105 or a waveguide 110 produces an optical gain for any optical signal having a wavelength between 0 and 45 nanometers longer than the wavelength of the pump signal 141. In a number of embodiments, photonic apparatus 105 or a waveguide 110 produces an optical gain for any optical signal having a wavelength between 0 and 45 nanometers shorter than the wavelength of the pump signal 141. Sometimes, the range of wavelengths for which the photonic apparatus 105 or a waveguide 110 produces an optical gain may be referred to as a gain range. In a plurality of embodiments, photonic structure 105 produces a gain of 25 decibels over the gain range. In some embodiments, the gain for a particular wavelength in the gain range may vary between 0 and 25 decibels.

Photonic apparatus 105 may also comprise one or more parametric oscillators which generate new coherent optical signals at wavelengths different than the wavelength of the pump signal 141. In some embodiments, parametric oscillators may be formed using feedback from an optical resonator. An optical resonator, in some embodiments, is a waveguide structure having a specific size or shape to form a standing wave. In a number of embodiments, optical resonator comprises two surfaces reflecting an optical signal and creating a standing wave. In some embodiments, optical resonator is an optical cavity. In a plurality of embodiments, waveguide 110 is an optical resonator. In some embodiments, the standing wave created by the optical resonator forms a new optical signal. The new optical signal created by the waveguide optical resonator, such as waveguide 110, may be amplified by a gain created by mixing of other optical signals. In a number of embodiments, parametric oscillator is formed using a signal from a waveguide 110, which acts as an optical resonator. In a plurality of embodiments, photonic apparatus 105 comprises a plurality of waveguides 110, wherein the feedback or signal from one of the waveguides of the plurality of waveguides is used for parametric oscillation inside of another waveguide. In some embodiments, waveguide 110 produces a standing wave, or a new optical signal, whose wavelength is within the gain range of photonic apparatus 105 and the intensity or power of the new optical signal is increased due to the mixing and anomalous group velocity dispersion produced by the photonic apparatus 105 or the waveguide 110.

Photonic apparatus 105 may also comprise an optical parametric amplifier which includes a pump laser or an optical monochromatic source supplying a pump signal and a waveguide receiving the pump signal. In some embodiments, photonic apparatus 105 comprises a resonating structure to achieve feedback and oscillation of an optical signal. In a number of embodiments, the resonating structure is a waveguide 110. In a plurality of embodiments, photonic apparatus 105 comprises a plurality of waveguides 110, each of which creates resonance at a different frequency. In some embodiments, photonic apparatus 105 comprises a waveguide coupled ring. In a number of embodiments, photonic apparatus 105 comprises a Fabry-Perot cavity. In a number of embodiments, the Fabry-Perot cavity is a waveguide 110. In a plurality of embodiments, photonic apparatus 105 comprises a Fabry-Perot cavity with Bragg structures. In some embodiments, the Fabry-Perot cavity with Bragg structures is a waveguide 110.

Photonic apparatus 105, in some embodiments, comprises a combination of different waveguides 110, each of which provides an oscillation for a specific frequency. In a number of embodiments, photonic apparatus 105 comprises a plurality of waveguides 110 some of which amplify or adjust optical intensity or power of at least two optical signals having different wavelengths. In a number of embodiments, photonic apparatus 105 is an all silicon package. In a plurality of embodiments, photonic apparatus 105 comprises any number of waveguides 110, each of which performs any one or a combination of oscillation, wave-guiding, amplification, wavelength shifting, or phase adjustment of any number of optical signals having same or different wavelengths. In some embodiments, photonic apparatus 105 is a photonic integrated circuit which performs division multiplexing of optical signals or wavelength conversion of optical signals. In a plurality of embodiments, photonic apparatus 105 utilizes one or more waveguides 110 to perform amplification of optical signals using a pump signal and mixing or four-wave mixing with optical signals whose wavelengths are within 50 nanometers of the pump signal. In a number of embodiments, photonic apparatus 105 utilizes waveguides 110 to produce, develop or form one or more new coherent light sources at wavelengths different from the wavelength of the pump signal.

Using any combination of these embodiments, a single pump laser may be used to generate a new optical signal within the gain range of the photonic apparatus 105 or waveguide 110. Using multiple new optical signals produced by the photonic apparatus 105 wavelength division multiplexed optically encoded information may be transferred via variety of mediums. In some embodiments, systems optically encoding information using wavelength division multiplexing may be produced.

Using any combination of these embodiments, photonic apparatus 105 may also perform wavelength conversion. In some embodiments, photonic apparatus 105 receives a first optical signal 140 and a second optical signal 141, wherein the wavelength of the first optical signal is a specific value of wavelengths shorter than the second optical signal 141. The first optical signal 140 and the second optical signal 141 are coupled by waveguide 110, within which the second optical signal 141 is subjected to mixing. In some embodiments, in addition to mixing the first optical signal or the second optical signal may further be subjected to anomalous group velocity dispersion by waveguide 110 or by photonic apparatus 105. In a number of embodiments, an optical gain is formed by mixing or anomalous group velocity dispersion, or a combination of both, and the first signal 140 changes the wavelength from being a specific value of wavelengths shorter than the second optical signal 141 to being the same specific value of wavelengths longer than the second optical signal 141. In some embodiments, wherein the first optical signal 140 comprises a wavelength which is a specific value of wavelengths longer than the second optical signal 141, the first optical signal 140 changes the wavelength to a wavelength shorter than the second optical signal 141 by the same specific value of wavelengths, in response to the mixing or the anomalous group velocity dispersion, or a combination of both.

Figure 1B:
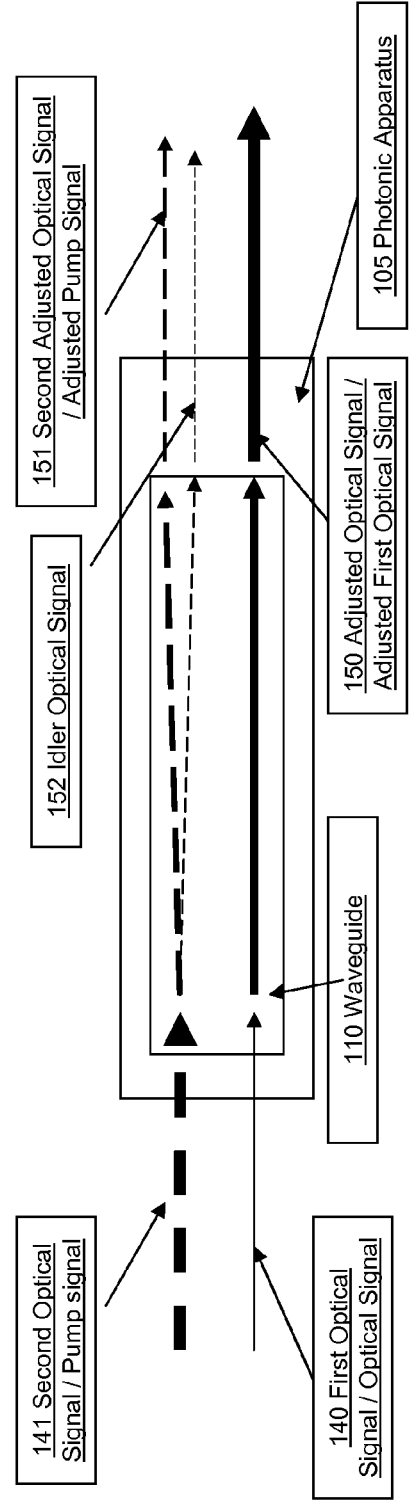
FIG. 1B is a block diagram illustrating some embodiments of a photonic apparatus for performing optical signal intensity or power adjustment or amplification and wavelength adjustment or conversion.

Referring now to FIG. 1B a top down, two dimensional view of the photonic apparatus 105 comprising a waveguide 110 is illustrated. The illustration also displays two inputs, first optical signal 140 and second optical signal 141, and three outputs, adjusted first optical signal 150, adjusted second optical signal 151 and idler optical signal 152. FIG. 1B also shows second optical signal 141 splitting into two additional optical signals. The two split signals decrease in intensity or power as they propagate through the waveguide 110 while the first optical signal 140 is increasing in intensity or power while propagating through the waveguide 110. On the right side of the illustration, the byproducts of the second optical signal 141, adjusted second optical signal 151 and idler optical signal 152, exit from the waveguide 110 and are emitted from the photonic apparatus 105 decrease in intensity or power.

Waveguide 110 is in some instances a waveguide or a device performing specific waveguide or photonic device related tasks. In a number of embodiments, waveguide 110 may be referred to as the semiconductor structure of the photonic apparatus 105, or just the semiconductor structure. In a plurality of embodiments, waveguide 110, comprises any of the features or embodiments of any waveguide or photonic device, including an optical amplifier, a wavelength converter, an oscillator, a optical signal phase adjuster, an optical signal emitter, an optical signal modulator, or a signal splitter. In some embodiments, waveguide 110 comprises any and all of a photonic apparatus 105. In a number of embodiments, waveguide is a photonic apparatus 105.

In some embodiments, waveguide 110 is referred to as a waveguide comprising dielectric and semiconductor materials. In a number of embodiments, waveguide 110 is a waveguide built on a silicon substrate surface. In plurality of embodiments, waveguide 110 is built on top of a silicon on insulator or SOI technology. In a plurality of embodiments, waveguide 110 is a structure, device or a waveguide built on a insulating layer comprising silicon dioxide or another material of similar electrically conductive properties sitting on top of a silicon substrate. In a number of embodiments, waveguide 110 is a waveguide forming an optical cavity for an optical signal of a specific wavelength range.

Waveguide 110, is some embodiments, is any photonic structure capable of adjusting, modulating or monitoring an optical wave or an optical signal. In some embodiments, waveguide 110 is a waveguide receiving or coupling an optical wave or an optical signal. In a plurality of embodiments, waveguide 110 comprises a waveguide guiding an optical signal within the waveguide structure. A waveguide may comprise any number of materials, such as, for example, dielectrics, semiconductors, metals, organic materials and any other material whose index of refraction is greater than 1. In certain embodiments, waveguide 110 comprises a waveguide comprising a semiconductor material, such as silicon or germanium. In some embodiments, waveguide 110 comprises a waveguide comprising glass or glass silica or an optical fiber. In a plurality of embodiments, waveguide 110 comprises a waveguide shaped as a cubical-like structure, a cylindrical structure, a triangular structure, or a structure comprising any number of shapes, sizes, flat or curved surfaces features or areas, fins, grooves or other shapes which affect the properties of the optical signals coupled within the waveguide 110. In some embodiments, waveguide 110 comprises an optical resonator forming an optical signal having a specific wavelength defined by the sizes of the waveguide. The semiconductor materials comprised by the waveguide 110 may have a crystalline structure and may or may not be implanted or otherwise processed.

Waveguide 110, in a number of embodiments, comprises an optical amplifier increasing, decreasing, or otherwise adjusting the intensity or the power of an optical signal. In a plurality of embodiments, waveguide 110 comprises a device or a structure changing or adjusting a wavelength of an input optical signal to a wavelength different from the original wavelength of the input optical signal. In some embodiments, waveguide 110 comprises a device or structure adjusting or changing the phase of the input optical signal to a phase different from the original phase of the input optical signal. In a plurality of embodiments, waveguide 110 comprises a device or a structure propagating a portion of an optical signal having a higher frequency faster than a portion of the optical signal having a lower frequency. In a number of embodiments, waveguide 110 comprises a device or a structure propagating a portion of an optical signal having a lower frequency faster than a portion of an optical signal having a higher frequency.

In some embodiments, waveguide 110 comprises an optical delay which delays one or more optical signals which propagate through the waveguide 110 by a specific amount of time. The waveguide 110 may emit the delayed optical signal the specific amount of time later than the optical signal would normally be emitted. In some embodiments, photonic apparatus 105 or waveguide 110 uses anomalous group velocity dispersion and mixing or four-wave mixing of optical signals within the photonic apparatus 105 or the waveguide 110 to adjust the travel time or delay one or more optical signals propagating or traveling through the photonic apparatus 105 or the waveguide 110. In a number of embodiments, waveguide 110 comprises a shape or size which induces anomalous group velocity dispersion or mixing of one or more optical signals. In a number of embodiments, the waveguide 110 further receives one or more optical signals which are subjected to mixing or four-wave mixing, in response to the anomalous group velocity dispersion or mixing or four-wave mixing, the waveguide 110 delays or adjusts travel time of one or more optical signals propagating through the waveguide 110. In a number of embodiments, photonic apparatus 105 comprises a waveguide 110 whose shape or size forms or provides anomalous group velocity dispersion and mixing or four-wave mixing of one or more optical signals received by the waveguide 110 and the waveguide 110, in response to the anomalous group velocity dispersion or mixing or four-wave mixing, delays or adjusts travel time of one or more optical signals propagating through the waveguide 110. In a number of embodiments, the waveguide 110 delays or adjusts the travel time of one or more optical signals in response to a combination of anomalous group velocity dispersion and mixing or four-wave mixing.

Waveguide 110 may comprise one or more devices, structures or components performing specific tasks or functions. In certain embodiments, waveguide 110 comprises an optical switch switching an optical signal on or off. In some embodiments, waveguide 110 is an optical switch switching an optical signal on or off. In a plurality of embodiments, waveguide 110 comprises a light source emitting a monochromatic light or a polychromatic light. In some embodiments, waveguide 110 is a light source emitting a monochromatic light or a polychromatic light. Sometimes, waveguide 110 comprises an optical signal regenerator receiving an optical signal, improving the signal's amplification or form and emitting it. Sometimes also, waveguide 110 is an optical signal regenerator receiving an optical signal, improving the signal's amplification or form and emitting it. In some embodiments, waveguide 110 comprises a device or a structure performing four-wave mixing of a plurality of optical signals or optical waves or is a device or a structure performing four-wave mixing of a plurality of optical signals or optical waves. In a number of embodiments, waveguide 110 comprises a device or a structure wherein an optical signal comprising a wavelength upon interacting with the device or the structure splits into two optical signals wherein the sum of the wavelengths of the two split signals equals the wavelength of the optical signal. In a number of embodiments, waveguide 110 is a device or a structure wherein an optical signal comprising a wavelength upon interacting with the device or the structure splits into two optical signals wherein the sum of the wavelengths of the two split signals equals the wavelength of the optical signal.

Waveguide 110 may comprise an optical coupler for receiving or coupling an optical signal into the waveguide 110. In some embodiments, the optical coupler may comprise a waveguide or a semiconductor area underneath a waveguide structure. In a number of embodiments, an optical coupler is an area, section or an extension of an optical waveguide. In a plurality of embodiments, an optical coupler comprises a separate section of the waveguide 110 specifically shaped to couple an optical signal of a specific wavelength range. Waveguide 110 may also comprise a structure or a device for inducing an optical resonance effect for a specific range of optical signals. In some embodiments, waveguide 110 comprises one or more three dimensional waveguide structures having sizes or shapes which create an optical interference between two or more optical signals or optical waves.

In some embodiments, waveguide 110 is a waveguide receiving a first optical signal 140 and a second optical signal 141. In certain embodiments, the first and the second optical signals, 140 and 141, are incident upon the silicon waveguide under a specific angle which causes the second optical signal 141 to form two additional optical signals within the waveguide whose sum of energies equals the energy of the second optical signal 141. In a number of embodiments, the waveguide of the waveguide 110 is a silicon structure sitting on top of a silicon substrate or on top of an insulator layer or an insulating material sitting on top of a silicon substrate such as a silicon dioxide. In some embodiments, the waveguide has a height, width and length. I The width and height may vary such that the cross-sectional area of the width and height (width times height) is in between the range of about 0.09 micrometers squared and 0.56 micrometers squared. The width and the height of the waveguide or the silicon waveguide, in some embodiments, vary between about 300 nanometers and about 1.87 micrometers. In a number of embodiments, the length of the silicon waveguide or the waveguide 110 is in between 6.4 millimeters and 17 millimeters. It is understood by someone ordinarily skilled in the art that the shape of the waveguide 110 may vary greatly as the ratios of the sizes are important, such as the cross-sectional areas for example.

In some embodiments, waveguide 110 has a width of 300 nanometers and a height of 600 nanometers or a height of 600 nanometers a width of 300 nanometers. In a plurality of embodiments, waveguide 110 has a width of 300 nanometers and a height of 550 nanometers or a height of 550 nanometers a width of 300 nanometers. In a number of embodiments, waveguide 110 has a width of 300 nanometers and a height of 600 nanometers or a height of 600 nanometers a width of 300 nanometers. In some embodiments, a waveguide 110 has a height of 200 nanometers and a width of 400 nanometers. In a plurality of embodiments, a waveguide 110 has a height of 400 nanometers and a width of 200 nanometers. In certain embodiments, a waveguide 110 has a height of 1000 nanometers and a width of 1500 nanometers. In some embodiments, a waveguide 110 has a height of 1500 nanometers and a width of 1000 nanometers. In some embodiments, a waveguide 110 has a height of between 200 nanometers and 1500 nanometers and a width of between 200 nanometers and 1500 nanometers. Furthermore, those ordinarily skilled in the art will understand that various materials used for manufacturing waveguide 110 may have a different index of refraction and different non linear responses and compensations have to be made accordingly to make them equivalent to this particular design in order to create effects such as anomalous group velocity dispersion within the waveguide 110.

Optical signals 140 and 141 may be coupled into the silicon waveguide or the waveguide 110 through the cross-sectional area of the height and width, such that the angle of incidence of these two optical signals are substantially perpendicular in relation to the cross-sectional area of width and height of the waveguide or the waveguide 110. Substantially perpendicular means perpendicular but altered by an angle within a range defined by the critical angle of the waveguide. In a number of embodiments, the sizes and shapes of a waveguide, such as the one whose cross-sectional area of height and width is in between 0.09 micrometers square and 0.56 micrometers square, cause an optical wave of a specific wavelength range to be subjected to an anomalous group velocity dispersive. Sometimes, when four-wave mixing is combined with two input signals, such as 140 and 141, coupled into the waveguide 110 and subjected to anomalous group velocity dispersion, where one of the two optical signals 140 or 141 is affected by optical parametric generation, and as the result of any one of these effects and any combination of them, optical amplification or wavelength conversion of any one of 140 or 141 is achieved. Sometimes, when a single optical signal, such as first optical signal 140 is the only input signal into the waveguide 110, having specific sizes of height and width and length creates anomalous group velocity dispersion for the optical signal 140 and thus changing the relation between higher frequency components and lower frequency components.

Referring now to FIG. 2A and FIG. 2B, a waveguide 110, sitting on top of dielectric material base 115 is illustrated receiving a first optical signal 140 and emitting adjusted first optical signal 150. The environment presented by FIG. 2A is inside the photonic apparatus 105. FIG. 2B presents a two dimensional top down view of the waveguide 110, inside photonic apparatus 105, receiving first optical signal 140, coupling the first optical signal 140, changing higher frequency components and lower frequency components and emit the adjusted first optical signal 150. The first optical signal 150 has the higher and lower frequency components of the signal adjusted.

FIG. 2A presents waveguide 110 shaped like a three dimensional cube-like waveguide. The waveguide may have any size and be of any three dimensional shape. Waveguide 110 is also presented sitting on top of dielectric material base 115. Depending on the index of refraction of the dielectric material base 115, the interface between the waveguide 110 and the dielectric material base 115 may affect propagation of the first optical signal 140 through the waveguide 110.

Dielectric material base 115 may be any material having an index of refraction different from the index of refraction of the material of the waveguide 110. In some embodiments, dielectric material base 115 is a silicon dioxide. In plurality of embodiments, embodiments, dielectric material base 115 is oxide layer grown on top of a silicon substrate. In a plurality of embodiments, dielectric material base 115 is a silicon monoxide. In some embodiments, dielectric material base 115 is a sapphire. In a number of embodiments, dielectric material base 115 is a material that does not conduct electricity. In some embodiments, dielectric material base 115 is a material that conducts electricity less efficiently than the material comprising waveguide 110. In certain embodiments, dielectric material base 115 is a material that conducts electricity more efficiently than the material of the waveguide 110.

FIG. 2A and FIG. 2B illustrate first optical signal 140 being transformed by the waveguide 110 inside of the photonic apparatus 105. FIG. 2B illustrates first optical signal 140 having a higher frequency component and a lower frequency component. FIG. 2B illustrates the two frequency components of the first optical signal 140 as two separate peaks.

In some embodiments, the first peak of the two peaks (e.g. the peak on the left side) of the first optical signal 140 represents higher frequency component while the second peak (e.g. the peak to the right) represents a lower frequency component. In such embodiments, specific size and shape of the waveguide 110 induces an anomalous group velocity dispersion upon the first optical signal 140 being coupled inside the waveguide. This may result in the higher frequency component to be adjusted in relation to the lower frequency component such that two peaks are closer together, and therefore the higher frequency component and the lower frequency component are less dispersed from each other. By the time the first optical signal exits the waveguide 110 and becomes adjusted first optical signal 150, the higher frequency component and lower frequency component are on top of one another and appear as a single, non-dispersed and non-distorted, optical signal. In such embodiments, waveguide 110 may act as an optical signal phase adjuster.

In some embodiments, first peak of the two peaks, the peak on the left side, of the first optical signal 140 represents lower frequency component while the second peak, the peak to the right, represents higher frequency component. In such embodiments, specific size and shape of the waveguide 110 induces an anomalous group velocity dispersion upon the first optical signal 140 being coupled inside the waveguide. This may result in the lower frequency component to be adjusted in relation to the higher frequency component such that two peaks are closer together, and therefore the higher frequency component and the lower frequency component are less dispersed from each other. By the time the first optical signal exits the waveguide 110 and becomes adjusted first optical signal 150, the lower frequency component and higher frequency component are on top of one another and appear as a single, non-dispersed and non-distorted, optical signal. In such embodiments, waveguide 110 may act as an optical signal phase adjuster.

B. The Method for Phase Adjustment

Figure 3:
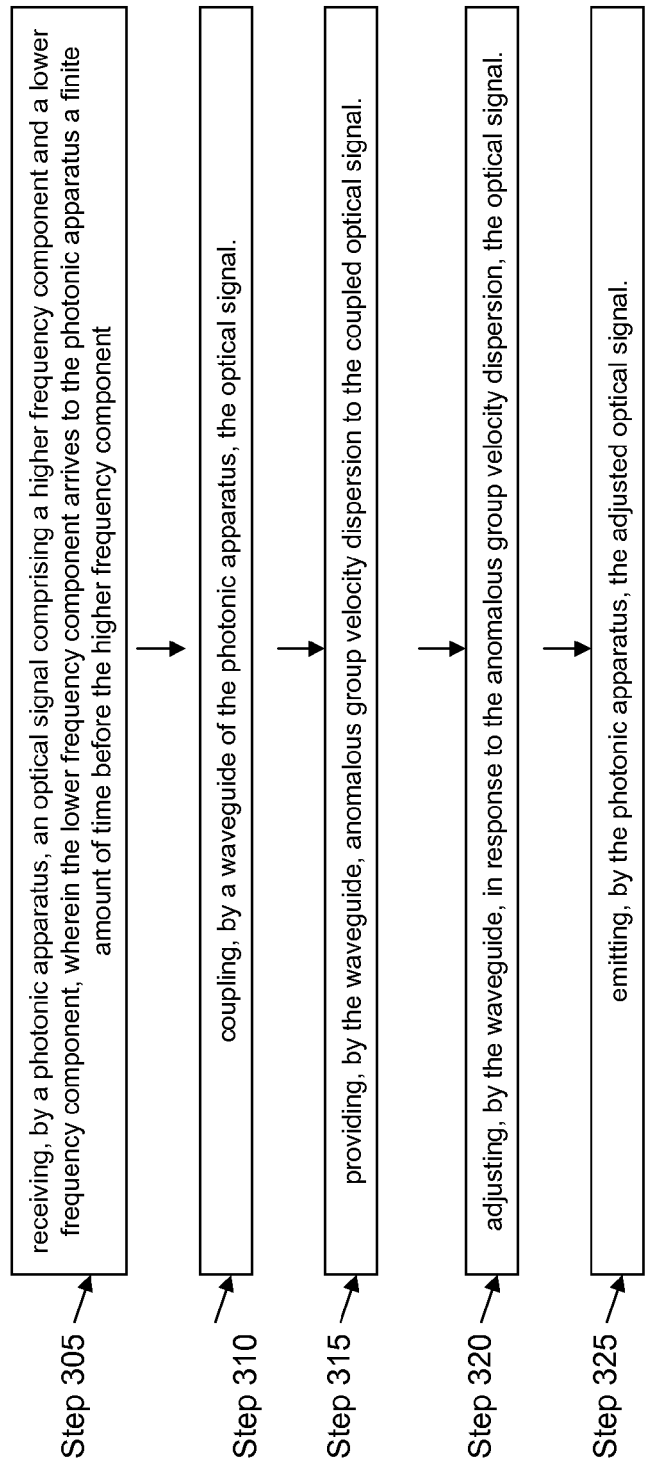
FIG. 3 is a flow diagram illustrating some embodiments of a method for phase adjustment of an optical signal performed by the photonic apparatus.

Referring now to FIG. 3, an embodiment of steps of a method for adjusting higher and lower frequency components of an optical signal is depicted. In some cases, this method may also be referred to as the method for phase shifting. The method may also be referred to as method 300. At step 305 of method 300, a photonic apparatus receives an optical signal comprising a higher frequency component and a lower frequency component, wherein the lower frequency component is propagated a amount of time before the higher frequency component. At step 310, the waveguide 110 of the photonic apparatus 105 is coupled to the optical signal. At step 315, the waveguide provides anomalous group velocity dispersion to the coupled optical signal. At step 320, the waveguide adjusts the optical signal by decreasing the amount of time in response to the dispersion. At step 315, the waveguide adjusts the optical signal by making the amount of time substantially equal to zero in response to the dispersion. At step 330, the waveguide adjusts the optical signal by moving the higher frequency component a new amount of time ahead of the lower frequency component in response to the providing. At step 330, the photonic apparatus emits the adjusted optical signal.

At step 305, a photonic apparatus receives an optical signal. The optical signal received comprises a higher frequency component and a lower frequency component, wherein the lower frequency component is propagated a finite amount of time before the higher frequency component. In some embodiments, the optical signal is an optical impulse signal, an optical clock signal or an optical binary signal each of which may have either a high or a low of a low value. In a number of embodiments, the high or the low are defined by intensity or power of the optical signal, by the frequency of the signal, by the wavelength of the signal or by a combination of any of the three. In some embodiments, the time difference in propagation between the higher frequency component and a lower frequency component, the amount of time, is due to the normal dispersion the optical signal has experienced prior to being received by the photonic apparatus 105. In some embodiments, the amount of time is difference in time of arrival to the photonic apparatus 105 between a lower frequency component and a higher frequency component of the optical signal. In some embodiments, the amount of time is measured in units of time such as seconds or fractions of seconds, such as nanoseconds or picoseconds. In some embodiments, the amount of time is measured in units of length, such as meters or fractions of meters such as nanometers or picometers.

At step 310, a waveguide of the photonic apparatus couples the optical signal. In a number of embodiments, photonic apparatus 105 may receive an optical signal which is subsequently coupled by the waveguide 110. In a plurality of embodiments, waveguide 110 couples the optical signal through a portion of the photonic apparatus 105. In a number of embodiments, waveguide 110 couples the optical signal directly without coupling it via photonic apparatus 105. In some embodiments, waveguide 110 couples the optical signal via evanescent coupling via 115 dielectric material base.

At step 315, the waveguide provides anomalous group velocity dispersion to the coupled optical signal. In some embodiments, anomalous group velocity dispersion is a dispersion which allows the higher frequency components of the optical signal to propagate faster than the lower frequency components of the optical signal. In a number of embodiments, anomalous group velocity dispersion is a dispersion which allows the lower frequency components of the optical signal to propagate faster than the higher frequency components of the optical signal. In some embodiments, anomalous group velocity dispersion is formed by any combination of shape, size or material composition of the waveguide. In some embodiments, anomalous group velocity dispersion is formed by or in part formed by a waveguide is a three dimensional semiconductor waveguide having a height, width and length, wherein all sides of the waveguide is interfacing with materials or mediums having different indexes of refraction than the material the waveguide is made up of. In some embodiments, anomalous group velocity dispersion is formed by, or in part formed by the sizes of the width, length or height of the waveguide 110. In a number of embodiments, anomalous group velocity dispersion is formed by, or in part formed by the ratio of the wavelength of the optical signal coupled by the waveguide and the cross-sectional area of the length and width, height and width or height and length. In a plurality of embodiments, anomalous group velocity dispersion is formed by, or in part formed by the difference in the index of refraction of the waveguide and the mediums or materials neighboring or interfacing the waveguide 110. In a number of embodiments, anomalous group velocity dispersion is formed by, or in part formed by any combination of any of the embodiments forming or partially forming the anomalous group velocity dispersion of the waveguide 110.

At step 320, the waveguide adjusts the optical signal by decreasing the amount of time in response to the anomalous group velocity dispersion. In some embodiments, the waveguide adjusts the optical signal by decreasing the amount of time in response to the providing of anomalous group velocity dispersion by the waveguide. In a plurality of embodiments, the amount of time is also specified as the difference in time of arrival to the photonic apparatus 105 of a portion of the optical signal having a range of higher frequency components and a portion of the optical signal have a range of the lower frequency components of the optical signal. In some embodiments, decreasing the amount of time refers to making the amount of time of the optical signal coupled inside of the waveguide 110 smaller than the amount of time initially was at the moment of receiving by the photonic apparatus 105.

In some embodiments, the waveguide adjusts the optical signal by making the amount of time substantially equal to zero in response to the anomalous group velocity dispersion. In some embodiments, the waveguide adjusts the optical signal by making the amount of time zero, or substantially equal to zero, in response to the providing of anomalous group velocity dispersion by the waveguide. Substantially close to zero may sometimes mean a zero. Substantially close to zero may also mean that the value of the amount of time has decreased to a value which is ten times smaller than the original value of the amount of time as it was received by the photonic apparatus 105. Sometimes, substantially close to zero means that the higher frequency component and the lower frequency component are in the same place relative to each other as they were upon the emission of the optical signal by the original light source which first emitted the optical signal.

In some embodiments, the waveguide adjusts the optical signal by moving the higher frequency component a new finite amount of time ahead of the lower frequency component in response to the anomalous group velocity dispersion. In some embodiments, the waveguide adjusts the optical signal by moving, shifting or adjusting the higher frequency component a new finite amount of time ahead of the lower frequency component in response to the providing of anomalous group velocity dispersion by the waveguide. In such embodiments, the higher frequency component will propagate a new finite amount of time ahead of the lower frequency component. In a number of embodiments, a new finite amount of time means any amount of time greater than zero. In a number of embodiments, the higher frequency component shifts in response to the anomalous group velocity dispersion in relation to the lower frequency component such that the higher frequency component propagates an amount of time ahead of the lower frequency component. In some embodiments, the lower frequency component shifts in response to the anomalous group velocity dispersion in relation to the higher frequency component such that the lower frequency component propagates an amount of time ahead of the higher frequency component.

At step 325, the photonic apparatus emits the adjusted optical signal. In some embodiments, the adjusted optical signal is the optical signal having the amount of time decreased. In a number of embodiments, the adjusted optical signal is the optical signal having the amount of time adjusted, decreased or changed to be substantially equal to zero. In a plurality of embodiments, the adjusted optical signal is the optical signal having the amount of time adjusted such that the higher frequency component is no longer propagating behind the lower frequency component but is propagating ahead of the lower frequency component.

C. The Method for Optical Signal Intensity or Power Adjustment

Figure 4:
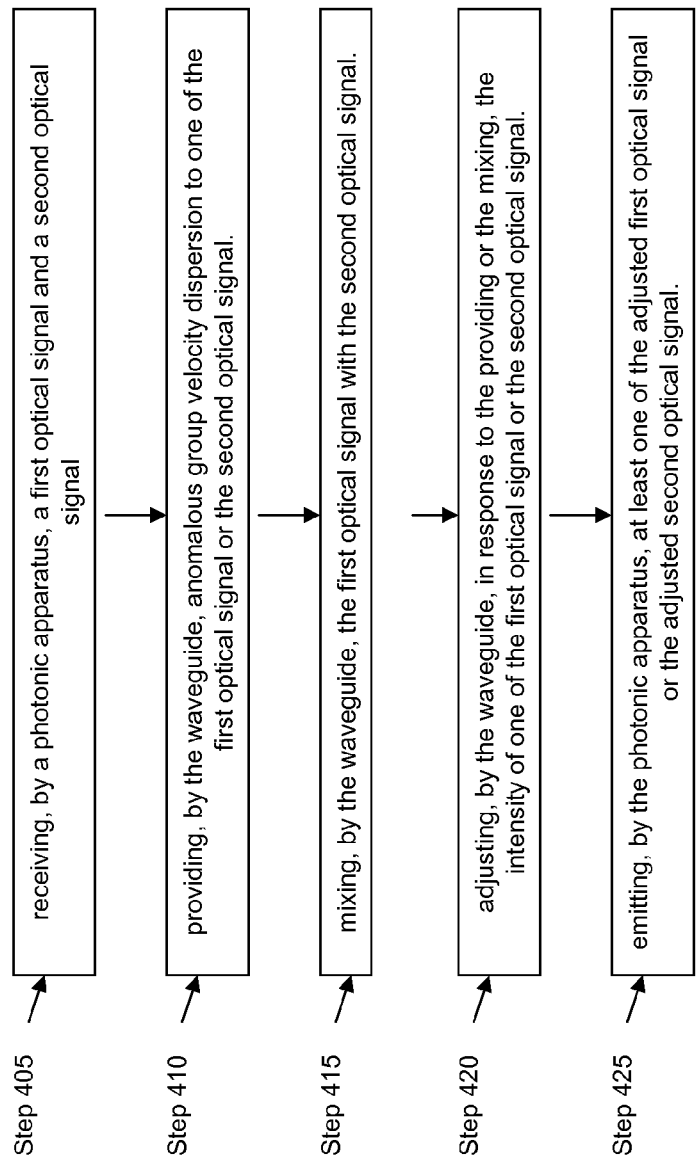
FIG. 4 is a flow diagram illustrating some embodiments of a method for optical signal intensity or power adjustment by the photonic apparatus.

Referring now to FIG. 4, an embodiment of steps of a method 400 for optical signal amplification is illustrated. At step 405 of method 400, a photonic apparatus receives a first optical signal and a second optical signal. At step 410, the waveguide provides anomalous group velocity dispersion to the first optical signal or the second optical signal. At step 415, the waveguide mixes the first optical signal with the second optical signal. At step 420, the waveguide, in response to the providing or the mixing, adjusts the intensity or power of the first optical signal or the second optical signal. At step 425, photonic apparatus emits at least one of the adjusted optical signal or the adjusted second optical signal.

At step 405, a photonic apparatus receives a first optical signal and a second optical signal. In some embodiments, photonic apparatus is the photonic apparatus 105 which receives the first and the second optical signals by coupling the signals via a waveguide or a signal receiving or signal coupling area or port. In some embodiments, the photonic apparatus 105 receives the first and the second optical signals by coupling via a semiconductor substrate beneath the waveguide 110. In a plurality of embodiments, the photonic apparatus 105 receives the first and the second optical signals by evanescent coupling. In some embodiments, the first and the second optical signals are coupled into the photonic apparatus by coupling via the waveguide 110.

At step 410, the waveguide provides anomalous group velocity dispersion to the first optical signal or the second optical signal. In some embodiments, anomalous group velocity dispersion is a dispersion which allows the higher frequency components of the optical signal to propagate faster than the lower frequency components of the optical signal. In a number of embodiments, anomalous group velocity dispersion is a dispersion which allows the lower frequency components of the optical signal to propagate faster than the higher frequency components of the optical signal. In some embodiments, anomalous group velocity dispersion is formed by any combination of shape, size or material composition of the waveguide. In some embodiments, anomalous group velocity dispersion is formed by or in part formed by a waveguide is a three dimensional semiconductor waveguide having a height, width and length, wherein all sides of the waveguide is interfacing with materials or mediums having different indexes of refraction than the material the waveguide is made up of. In some embodiments, anomalous group velocity dispersion is formed by, or in part formed by the sizes of the width, length or height of the waveguide 110. In a number of embodiments, anomalous group velocity dispersion is formed by, or in part formed by the ratio of the wavelength of the optical signal coupled by the waveguide and the cross-sectional area of the length and width, height and width or height and length. In a plurality of embodiments, anomalous group velocity dispersion is formed by, or in part formed by the difference in the index of refraction of the waveguide and the mediums or materials neighboring or interfacing the waveguide 110. In a number of embodiments, anomalous group velocity dispersion is formed by, or in part formed by any combination of any of the embodiments forming or partially forming the anomalous group velocity dispersion of the waveguide 110.

At step 415, the waveguide mixes the first optical signal with the second optical signal. In some embodiments, the mixing of the first optical signal with the second optical signal means four-wave mixing of the first optical signal with the second optical signal. In a number of embodiments, the second optical signal is divided into two additional optical signals, the sum energy of which is equivalent to the energy of first or the second optical signal divided. In some embodiments, a nonlinear optical crystal is used to further assist with dividing of the first or the second optical signal. In a number of embodiments, a crystalline structure of the silicon semiconductor or any other crystalline semiconductor may be used to induce dividing of the second optical signal. The two additional optical signals formed by the dividing of the second optical signal may have their wavelengths adjusted by changing the angle of incidence of the second optical signal in relation to the axes of the crystalline structure of the material forming the waveguide 110. This process of optical signal dividing into two additional signals may be referred to as optical parametric generation. In some embodiments, optical parametric generation may be used for either first optical signal or the second optical signal. In a number of embodiments, second optical signal is divided using optical parametric generation and the two additional optical signals, are used together with the first optical signal for mixing, or four-wave mixing, inside the waveguide 110. Terms mixing or four-wave mixing may be used interchangeably. In a number of embodiments, optical parametric generation of either first optical signal or the second optical signal is combined with the anomalous group velocity dispersion to adjust or increase the intensity or power of the first optical signal or the second optical signal.

At step 420, the waveguide, in response to the providing of the anomalous group velocity dispersion or the mixing, adjusts the intensity or power of the first optical signal or the second optical signal. In some embodiments, the waveguide, in response to the providing of the anomalous group velocity dispersion, adjusts the intensity or power of the first optical signal or the second optical signal. In a number of embodiments, the waveguide, in response to the mixing, or the four-wave mixing, adjusts the intensity or power of the first optical signal or the second optical signal. In a plurality of embodiments, the waveguide, in response to the combination of mixing of the optical signals or providing of anomalous group velocity dispersion, adjusts the intensity or power of the first optical signal or the second optical signal.

At step 425, the photonic apparatus emits at least one of the adjusted optical signal or the adjusted second optical signal. In a number of embodiments, the photonic apparatus emits the adjusted first optical signal. In a plurality of embodiments, the photonic apparatus emits the adjusted second optical signal. In some embodiments, the photonic apparatus emits the adjusted first optical signal and the second optical signal. In a number of embodiments, the photonic apparatus emits the additional optical signals formed by the optical parametric generation of the first optical signal or the second optical signal.

D. The Method for Optical Signal Wavelength Adjustment

Figure 5:
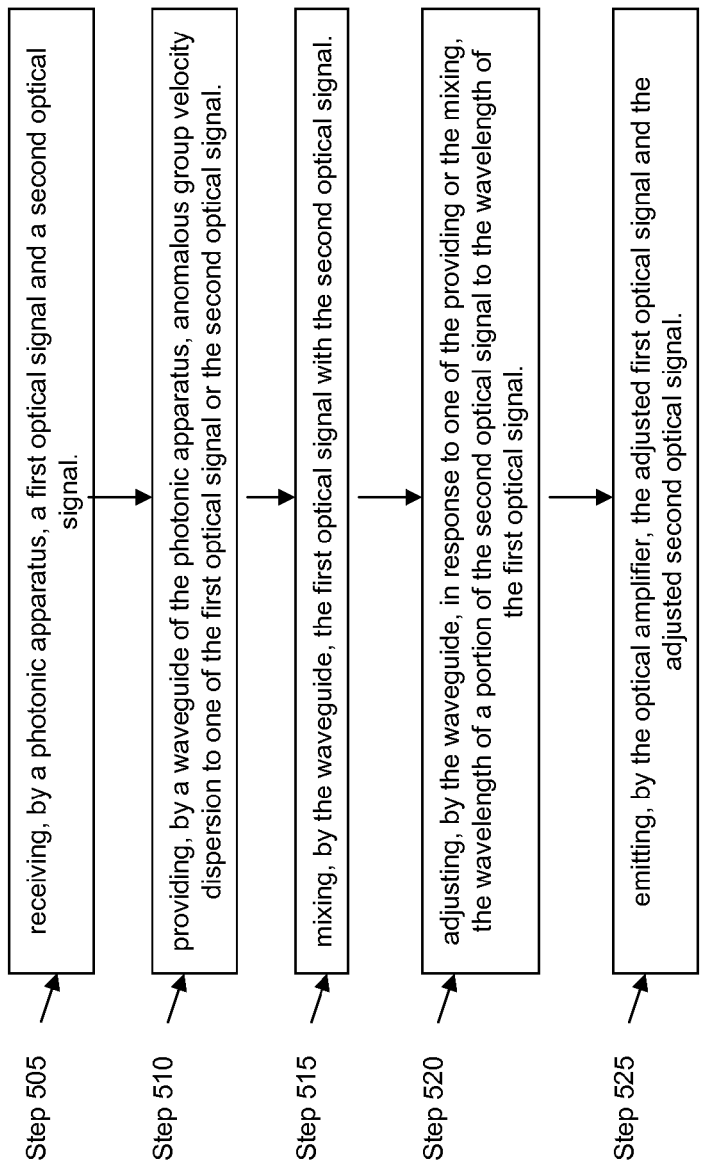
FIG. 5 is a flow diagram illustrating some embodiments of a method wavelength adjustment by the photonic apparatus.

Referring now to FIG. 5, an embodiment of steps of a method 500 for wavelength adjustment of an optical signal over a range of wavelengths is illustrated. At step 505 of method 500, a photonic apparatus receives a first optical signal and a second optical signal. At step 510, a waveguide of the photonic apparatus provides anomalous group velocity dispersion to one of the first optical signal or the second optical signal. At step 515, the waveguide mixes the first optical signal with the second optical signal. At step 520, the waveguide adjusts, in response to one of the providing or the mixing, the wavelength of a portion of the second optical signal to the wavelength of the first optical signal. At step 525, the optical amplifier emits the adjusted first optical signal and the adjusted second optical signal.

At step 505, a photonic apparatus receives a first optical signal and a second optical signal. In some embodiments, photonic apparatus is the photonic apparatus 105 which receives the first and the second optical signals by coupling the signals via a waveguide or a signal receiving or signal coupling area or port. In some embodiments, the photonic apparatus 105 receives the first and the second optical signals by coupling via a semiconductor substrate beneath the waveguide 110. In a plurality of embodiments, the photonic apparatus 105 receives the first and the second optical signals by evanescent coupling. In some embodiments, the first and the second optical signals are coupled into the photonic apparatus by coupling via the waveguide 110.

At step 510 a waveguide of the photonic apparatus provides anomalous group velocity dispersion to one of the first optical signal or the second optical signal. In some embodiments, anomalous group velocity dispersion is a dispersion which allows the higher frequency components of the optical signal to propagate faster than the lower frequency components of the optical signal. In a number of embodiments, anomalous group velocity dispersion is a dispersion which allows the lower frequency components of the optical signal to propagate faster than the higher frequency components of the optical signal. In some embodiments, anomalous group velocity dispersion is formed by any combination of shape, size or material composition of the waveguide. In some embodiments, anomalous group velocity dispersion is formed by or in part formed by a waveguide is a three dimensional semiconductor waveguide having a height, width and length, wherein all sides of the waveguide is interfacing with materials or mediums having different indexes of refraction than the material the waveguide is made up of. In some embodiments, anomalous group velocity dispersion is formed by, or in part formed by the sizes of the width, length or height of the waveguide 110. In a number of embodiments, anomalous group velocity dispersion is formed by, or in part formed by the ratio of the wavelength of the optical signal coupled by the waveguide and the cross-sectional area of the length and width, height and width or height and length. In a plurality of embodiments, anomalous group velocity dispersion is formed by, or in part formed by the difference in the index of refraction of the waveguide and the mediums or materials neighboring or interfacing the waveguide 110. In a number of embodiments, anomalous group velocity dispersion is formed by, or in part formed by any combination of any of the embodiments forming or partially forming the anomalous group velocity dispersion of the waveguide 110.

At step 515, the waveguide mixes the first optical signal with the second optical signal. In some embodiments, the mixing of the first optical signal with the second optical signal means four-wave mixing of the first optical signal with the second optical signal. In a number of embodiments, the second optical signal is divided into two additional optical signals, the sum energy of which is equivalent to the energy of first or the second optical signal divided. In some embodiments, a nonlinear optical crystal is used to further assist with dividing of the first or the second optical signal. In a number of embodiments, a crystalline structure of the silicon semiconductor or any other crystalline semiconductor may be used to induce dividing of the second optical signal. The two additional optical signals formed by the dividing of the second optical signal may have their wavelengths adjusted by changing the angle of incidence of the second optical signal in relation to the axes of the crystalline structure of the material forming the waveguide 110. This process of optical signal dividing into two additional signals may be referred to as optical parametric generation. In some embodiments, optical parametric generation may be used for either first optical signal or the second optical signal. In a number of embodiments, second optical signal is divided using optical parametric generation and the two additional optical signals, are used together with the first optical signal for mixing, or four-wave mixing, inside the waveguide 110. Terms mixing or four-wave mixing may be used interchangeably. In a number of embodiments, optical parametric generation of either first optical signal or the second optical signal is combined with the anomalous group velocity dispersion to adjust or increase the intensity or power of the first optical signal or the second optical signal.

At step 520, the waveguide adjusts, in response to one of the dispersion or the mixing, the wavelength of a portion of the second optical signal to the wavelength of the first optical signal. In some embodiments, the waveguide, in response to the providing of the anomalous group velocity dispersion, adjusts the wavelength of a portion of the second optical signal to the wavelength of the first optical signal. In a number of embodiments, the waveguide, in response to the mixing, or the four-wave mixing, adjusts the wavelength of a portion of the second optical signal to the wavelength of the first optical signal. In a plurality of embodiments, the waveguide, in response to the combination of mixing of the optical signals or providing of anomalous group velocity dispersion, adjusts the wavelength of a portion of the second optical signal to the wavelength of the first optical signal. In some embodiments, the waveguide, in response to the providing of the anomalous group velocity dispersion, adjusts the wavelength of a portion of the first optical signal to the wavelength of the second optical signal. In a number of embodiments, the waveguide, in response to the mixing, or the four-wave mixing, adjusts the wavelength of a portion of the first optical signal to the wavelength of the second optical signal. In a plurality of embodiments, the waveguide, in response to the combination of mixing of the optical signals or providing of anomalous group velocity dispersion, adjusts the wavelength of a portion of the first optical signal to the wavelength of the second optical signal.

At step 525, the optical amplifier emits the adjusted first optical signal and the adjusted second optical signal. In a number of embodiments, the photonic apparatus emits the adjusted first optical signal. In a plurality of embodiments, the photonic apparatus emits the adjusted second optical signal. In some embodiments, the photonic apparatus emits the adjusted first optical signal and the second optical signal. In a number of embodiments, the photonic apparatus emits the additional optical signals formed by the optical parametric generation of the first optical signal or the second optical signal.

It should be understood that FIG. 1A through FIG. 5 comprise embodiments which are not to be used to limit the present invention. Any of the embodiments of any system component or any optical signal may be combined with any other embodiment herein. In some embodiments the first optical signal, the optical signal, the second optical signal, the two additional optical signals formed by optical parametric generation, the first adjusted optical signal and the second adjusted optical signals may be used interchangeably and may combine any of their embodiments.

What is claimed is:

1. A system for generating new coherent optical signals at wavelengths different than the wavelength of a pump signal comprising:

a light source that supplies a pump signal; and a parametric oscillator that receives the pump signal and generates new coherent optical signals at wavelengths different than the wavelength of the pump signal, wherein the parametric oscillator comprises a waveguide which acts as an optical resonator and the intensity or power of the new coherent optical signals is increased due to mixing and anomalous group velocity dispersion produced by the waveguide, wherein the waveguide has an aspect ratio in the range of about 1:1 to about 3:1.

2. The system of claim 1, wherein the new coherent optical signals are used for parametric oscillation inside the parametric oscillator to generate additional new coherent optical signals.

3. The system of claim 1, wherein the system comprises more than one parametric oscillator.

4. The system of claim 3, wherein the parametric oscillators comprise waveguides which act as optical resonators and the feedback or signal from one of the waveguides is used for parametric oscillation inside of another waveguide.

5. The system of claim 3, wherein each parametric oscillator creates resonance at a different frequency.

6. The system of claim 1, wherein the waveguide has a specific size or shape to form a standing wave.

7. The system of claim 1, wherein a cross-sectional area of the waveguide is between about 0.09 $\mu m^2$ and about 0.56 $m^2$.

8. The system of claim 1, wherein the waveguide has a height of between 200 nm and 1,500 nm and a width of between 200 nm and 1,500 nm.

9. The system of claim 1, wherein a cross-sectional area of the waveguide is a rectangle.

10. The system of claim 1, wherein a cross-sectional area of the waveguide is a circle.

11. The system of claim 1, wherein a cross-sectional area of the waveguide is a triangle.

12. The system of claim 1, wherein the waveguide produces an anomalous group velocity dispersion that is less than about 1,856 ps/(nm.km).

13. The system of claim 1, wherein the waveguide produces an anomalous group velocity dispersion in the range of 200 to 1,100 ps/(nm.km) for a pump signal with a 1.55 $\mu m$ wavelength.

14. The system of claim 1, wherein the waveguide comprises a semiconductor material.

15. The system of claim 14, wherein the waveguide comprises silicon or germanium.

16. The system of claim 1, wherein the waveguide comprises glass, glass silica or an optical fiber.

17. The system of claim 1, wherein the waveguide is a waveguide coupled ring.

18. The system of claim 1, wherein the waveguide is an optical cavity.

19. The system of claim 18, wherein the optical cavity is a Fabry-Perot cavity.

20. The system of claim 18, wherein the optical cavity is a Fabry-Perot cavity with Bragg structures.

21. The system of claim 1, wherein the pump signal has a wavelength in the telecommunications band.

22. The system of claim 1, wherein the light source is an optical monochromatic source.

23. The system of claim 1, wherein the new coherent optical signals are produced at wavelengths within 100 nm of the pump signal wavelength.

24. The system of claim 1, wherein the system performs wavelength conversion of optical signals.

25. The system of claim 1, wherein the system performs division multiplexing of optical signals.

26. The system of claim 1, wherein the parametric oscillator splits the pump signal into two optical signals with wavelengths different than the wavelength of the pump signal.

27. The system of claim 26, wherein the two optical signals and a remaining portion of the pump signal mix with another optical signal within the parametric oscillator.

28. The system of claim 1, wherein the new coherent optical signals are pulsed optical signals.

29. The system of claim 1, wherein the pump signal is a pulse optical signal.

30. The system of claim 1, wherein the waveguide comprises at least one of a dielectric, a semiconductor material, a metal, and an organic material.

31. A system for generating new coherent optical signals at wavelengths different than the wavelength of a pump signal comprising:
   a light source that supplies a pump signal; and
   a parametric oscillator that receives the pump signal and generates new coherent optical signals at wavelengths different than the wavelength of the pump signal, wherein the parametric oscillator comprises a waveguide which acts as an optical resonator and the intensity or power of the new coherent optical signals is increased due to mixing and anomalous group velocity dispersion produced by the waveguide,
   wherein the system comprises more than one parametric oscillator, and
   wherein the parametric oscillators comprise waveguides which act as optical resonators and the feedback or signal from one of the waveguides is used for parametric oscillation inside of another waveguide.

32. The system of claim 31, wherein the new coherent optical signals are used for parametric oscillation inside the first parametric oscillator to generate additional new coherent optical signals.

33. A system for generating new coherent optical signals at wavelengths different than the wavelength of a pump signal comprising:
   a light source that supplies a pump signal; and
   a parametric oscillator that receives the pump signal and generates new coherent optical signals at wavelengths different than the wavelength of the pump signal, wherein the parametric oscillator comprises a waveguide which acts as an optical resonator and the intensity or power of the new coherent optical signals is increased due to mixing and anomalous group velocity dispersion produced by the waveguide,
   wherein a cross-sectional area of the waveguide is between about 0.09 $\mu m^2$ and about 0.56 $m^2$.

34. The system of claim 33, wherein the new coherent optical signals are used for parametric oscillation inside the first parametric oscillator to generate additional new coherent optical signals.

35. A system for generating new coherent optical signals at wavelengths different than the wavelength of a pump signal comprising:
   a light source that supplies a pump signal; and
   a parametric oscillator that receives the pump signal and generates new coherent optical signals at wavelengths different than the wavelength of the pump signal, wherein the parametric oscillator comprises a waveguide which acts as an optical resonator and the intensity or power of the new coherent optical signals is increased due to mixing and anomalous group velocity dispersion produced by the waveguide,
   wherein the waveguide has a height of between 200 nm and 1,500 nm and a width of between 200 nm and 1,500 nm.

36. The system of claim 35, wherein the new coherent optical signals are used for parametric oscillation inside the first parametric oscillator to generate additional new coherent optical signals.

37. A system for generating new coherent optical signals at wavelengths different than the wavelength of a pump signal comprising:
   a light source that supplies a pump signal; and
   a parametric oscillator that receives the pump signal and generates new coherent optical signals at wavelengths different than the wavelength of the pump signal, wherein the parametric oscillator comprises a waveguide which acts as an optical resonator and the intensity or power of the new coherent optical signals is increased due to mixing and anomalous group velocity dispersion produced by the waveguide, wherein the waveguide produces an anomalous group velocity dispersion that is less than about 1,856 ps/(nm.km).

38. The system of claim 37, wherein the new coherent optical signals are used for parametric oscillation inside the parametric oscillator to generate additional new coherent optical signals.

39. A system for generating new coherent optical signals at wavelengths different than the wavelength of a pump signal comprising:
- a light source that supplies a pump signal; and
- a parametric oscillator that receives the pump signal and generates new coherent optical signals at wavelengths different than the wavelength of the pump signal, wherein the parametric oscillator comprises a waveguide which acts as an optical resonator and the intensity or power of the new coherent optical signals is increased due to mixing and anomalous group velocity dispersion produced by the waveguide,
- wherein the waveguide produces an anomalous group velocity dispersion in the range of 200 to 1,100 ps/(nm.km) for a pump signal with a 1.55 μm wavelength.

40. The system of claim 39, wherein the new coherent optical signals are used for parametric oscillation inside the parametric oscillator to generate additional new coherent optical signals.

41. A system for generating new coherent optical signals at wavelengths different than the wavelength of a pump signal comprising:
- a light source that supplies a pump signal; and
- a parametric oscillator that receives the pump signal and generates new coherent optical signals at wavelengths different than the wavelength of the pump signal, wherein the parametric oscillator comprises a waveguide which acts as an optical resonator and the intensity or power of the new coherent optical signals is increased due to mixing and anomalous group velocity dispersion produced by the waveguide,
- wherein the waveguide is a waveguide coupled ring.

42. The system of claim 41, wherein the new coherent optical signals are used for parametric oscillation inside the parametric oscillator to generate additional new coherent optical signals.

43. A system for generating new coherent optical signals at wavelengths different than the wavelength of a pump signal comprising:
- a light source that supplies a pump signal; and
- a parametric oscillator that receives the pump signal and generates new coherent optical signals at wavelengths different than the wavelength of the pump signal, wherein the parametric oscillator comprises a waveguide which acts as an optical resonator and the intensity or power of the new coherent optical signals is increased due to mixing and anomalous group velocity dispersion produced by the waveguide,
- wherein the parametric oscillator comprises an optical cavity that is a Fabry-Perot cavity.

44. The system of claim 43, wherein the new coherent optical signals are used for parametric oscillation inside the parametric oscillator to generate additional new coherent optical signals.

45. A system for generating new coherent optical signals at wavelengths different than the wavelength of a pump signal comprising:
- a light source that supplies a pump signal; and
- a parametric oscillator that receives the pump signal and generates new coherent optical signals at wavelengths different than the wavelength of the pump signal, wherein the parametric oscillator comprises a waveguide which acts as an optical resonator and the intensity or power of the new coherent optical signals is increased due to mixing and anomalous group velocity dispersion produced by the waveguide,
- wherein the new coherent optical signals are produced at wavelengths within 100 nm of the pump signal wavelength.

46. The system of claim 45, wherein the new coherent optical signals are used for parametric oscillation inside the parametric oscillator to generate additional new coherent optical signals.

* * * * *